(12) United States Patent
Franta

(10) Patent No.: US 8,201,309 B1
(45) Date of Patent: Jun. 19, 2012

(54) ATTACHMENT HARDWARE

(76) Inventor: John E. Franta, Mesa, AZ (US)

( * ) Notice: Subject to any disclaimer, the term of this patent is extended or adjusted under 35 U.S.C. 154(b) by 820 days.

(21) Appl. No.: 12/221,099

(22) Filed: Jul. 30, 2008

Related U.S. Application Data

(60) Provisional application No. 60/962,344, filed on Jul. 30, 2007.

(51) Int. Cl.
*F16G 11/00* (2006.01)
(52) U.S. Cl. .................. 24/129 R; 24/265 AL; 24/910
(58) Field of Classification Search .............. 24/129 R, 24/130, 265 AL, 910; 294/74; 403/210
See application file for complete search history.

(56) References Cited

U.S. PATENT DOCUMENTS

| | | | | |
|---|---|---|---|---|
| 1,859,143 A * | 5/1932 | Howe | .............. | 403/210 |
| 2,729,480 A * | 1/1956 | Berndt | .............. | 403/210 |
| 3,174,780 A * | 3/1965 | Shapiro | .............. | 403/210 |
| 3,631,570 A * | 1/1972 | Coleman | .............. | 24/129 R |
| 3,932,697 A * | 1/1976 | Hood | .............. | 174/79 |
| 4,358,212 A * | 11/1982 | Compton | .............. | 403/210 |

* cited by examiner

*Primary Examiner* — Robert J Sandy
*Assistant Examiner* — Tyler Johnson
(74) *Attorney, Agent, or Firm* — Ronald R. Kilponen

(57) ABSTRACT

Various connectors are shown and disclosed for attaching rope, cable or synthetic lines to fixed surfaces. Lashing line is used between the connector on the line and the connector attached to the fixed surface. Alternative embodiments are shown that use a cleat or a cam for securing the lashing line for adjusting the overall line length. The lines and connectors can be used for rigging in sailing vessels and for any other application requiring strong lines, connectors and light weight.

3 Claims, 31 Drawing Sheets

(Prior Art)

ATTACHMENT HARDWARE

CROSS REFERENCE TO RELATED APPLICATIONS

This application claims the benefit of Provisional application for Patent Ser. No. 60/962,344 filed on Jul. 30, 2007.

FIELD

The present version of these embodiments relate generally to the field of hardware for attaching lines that secure rigging and other items on sailing vessels, other vessels and anywhere that strong lightweight fasteners are needed.

BACKGROUND

This invention relates to hardware for attaching rigging to sailing vessels and other vessels and more particularly to devices that are used to affix the rigging or other items to a sailing vessel deck or other attachment points. While the embodiments shown and described herein can be used on vessels, ships, boats and other water crafts, it should be understood that these devices can be used anywhere that rope, lines or cable are used.

Sailing vessels and other vessels have hardware such as masts and other items attached to the deck of the vessel for running and attaching the sails and generally making the vessel move in the water under the power of the wind or via mechanical means. This hardware was in the past affixed with ropes to various attachment points on the deck. As the materials and engineering have evolved, the ropes and attachments have changed generally to stainless steel cable and stainless steel hardware which is more or less considered to be the standard for a majority of the sailing world.

Applicant's have made an addition to the rigging and hardware art that can be used to affix a mast and other items on a vessel by using a synthetic line material and attachment hardware that is specifically designed to be used with this synthetic line. The hardware can also be manufactured from titanium or aluminum which significantly reduces the weight of the hardware as compared to standard hardware which is generally made from stainless steel. In addition, the synthetic line is also lighter than comparable strength stainless steel line, so additional weight savings can be achieved from both the synthetic lines and the new hardware disclosed.

Applicant's lines are attached to hardware. The hardware is then attached to a fixed location with lashing line. The hardware could be fastened to a fixed location on each end but if the line were to stretch there is no way to tighten the line. Background art uses complicated and heavy turn buckles to tighten lines with fixed ends, where the turnbuckle is located between the fitting near the deck for example and the deck mounting. While these devices are convenient they are heavy. Applicant attaches the fixed ends of line to hardware and lashing line is then run between the hardware at the end of the line and the hardware mounted to the fixed location. This lashing line can then be loosened or tightened by tying the lashing line to itself or securing the lashing line with a cleat or cam system.

Applicant's hardware is also designed for specific diameter and specific type of synthetic lines. Synthetic line is similar to, but generally has better properties as compared to the background art. This synthetic line is optimized with various attachment methods and applicant has developed hardware that is optimized for the user's choice of synthetic line diameter and type of line.

For the foregoing reasons, there is a need for new rigging hardware designed specifically for synthetic lines that offers the user the same or increased strength with reduced weight as compared to the existing rigging and lines.

These embodiments, along with various features of novelty which characterize these embodiments, are pointed out with particularity herein. For a better understanding of these embodiments, the operating advantages and the specific advantages attained by its uses, reference should be had to the accompanying drawings and descriptive matter in which there is illustrated a preferred embodiment.

DETAILED DESCRIPTION OF PREFERRED EMBODIMENTS

Figure 1:
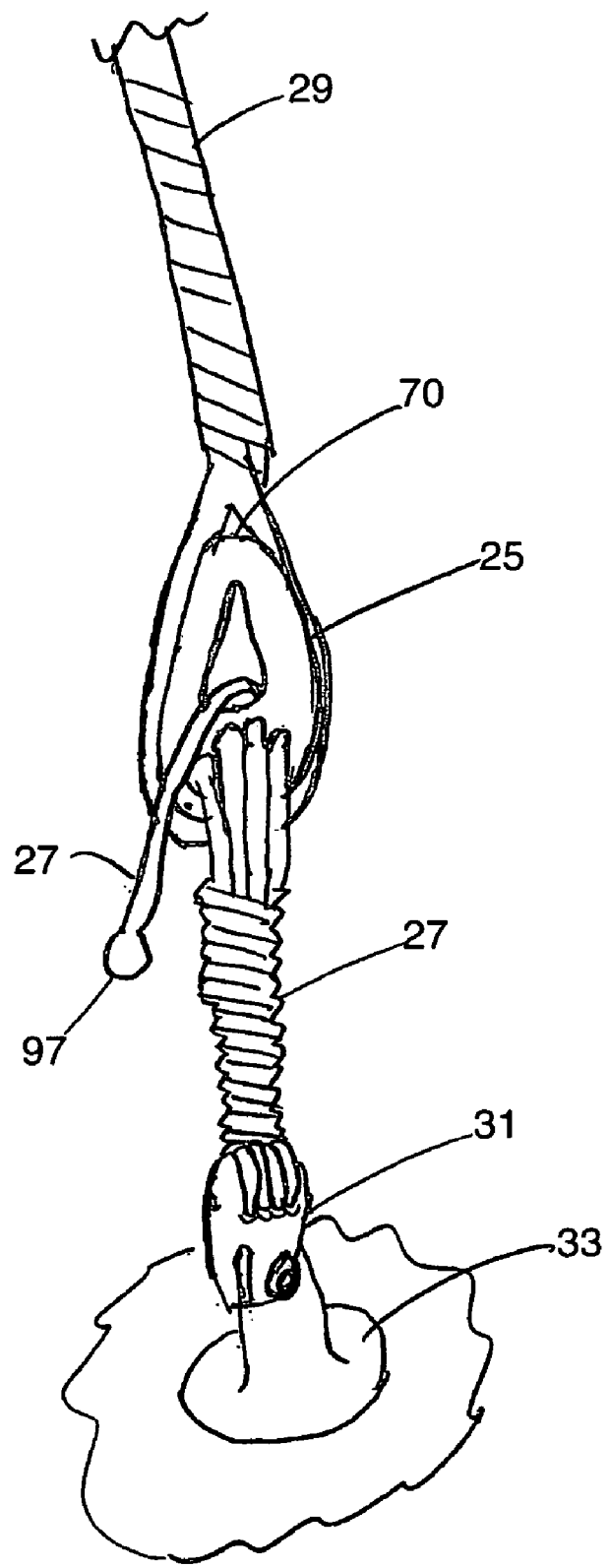
FIG. 1 shows a perspective view of one embodiment of some hardware attached to line.

Referring to the drawings in detail wherein like elements are indicated by like numerals, there is shown in FIG. 1 a perspective view of one embodiment of a distributor 31 attached to an anchor point 33 which is attached to, in this instance, the decking of a boat. The lashing 27 is tied to a distributor 31 on one end and tied to a terminator 25 on the other end. The lashing 27 is initially connected (in this figure) in a series of vertical loops between the distributor 31 and terminator 25. The loops of lashing 27 are inserted through slots 34, 36, 44, 46 in both the distributor 31 and terminator 25. The radius of the slots 34, 36, 44, 46 is approximately 5 times the diameter of the lashing 27 to prevent the kinking of the lashing that can occur if the radius is smaller.

Once the vertical elements of lashing 27 are tightened, a horizontal or wrapping of the lashing 27 around the vertical elements is used to pull the vertical strands or elements together and further tightening the interconnection of the distributor 31 and the terminator 25. The line 29 is spliced to the terminator 25 as is known in the art.

One end of the line 29 is spliced to a terminator 25, and the other end of the line 29 can be attached to various sails, masts and other items on a vessel or even another terminator. The spliced line 29 after splicing rests in the curved slot 26. Curved slot 26 has a radius of approximately five times the diameter of the line 29 to which it is being spliced. This is recommended as if the line 29 is spliced with a smaller radial curved slot 26 it can cause kinking of the line which decreases the relative strength of the line 29.

It should be noted that this embodiment of the terminator 25 has an apex 70 or pointy section. This apex 70 is truncated such that the sides of the terminator 25 that house the sections of line 29 (in curved slots 26) is shortened as compared to the background art, see FIGS. 19 & 20. This shorter apex 70 of terminator 25 provides an advantage over the background art. The shorter apex 70 allows the line 29 to be spliced together closer to the applicant's apex 70. When the assembly shown in FIG. 1 is tightened, the line 29 in the curved slots is more likely to be retained in contact with the curved slots 26 which lessens the likelihood of chafing or wear as more of the line 29 is protected.

Figure 19:
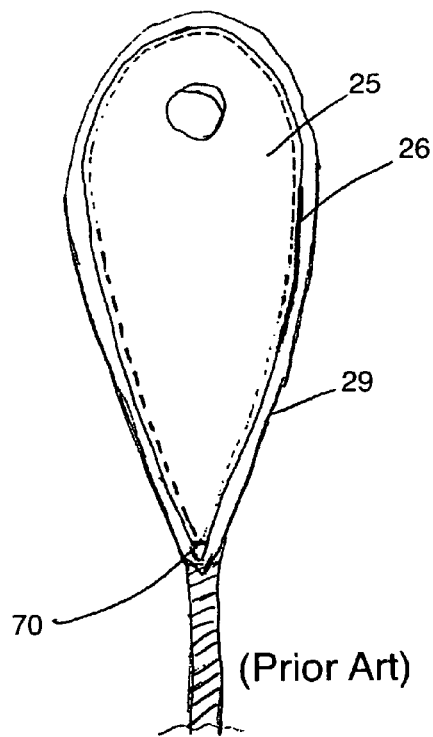
FIG. 19 shows one embodiment of a background terminator spliced to a line.
Figure 20:
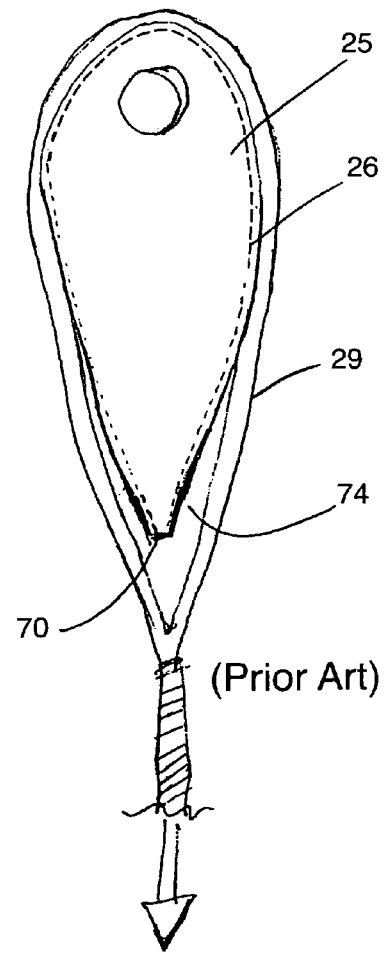
FIG. 20 shows an exaggerated view of a background terminator spliced to a line and loaded.

In the background art, see FIGS. 19 & 20, the apex 70 comes to a near point which does not allow the splicing of the rope or line 29 as close to the curved slots 26 of the background art. Consequently, where the line 29 or rope of the background art is tightened, the line 29 loses contact with the curves slots 26 especially near the apex 70 and is more exposed to wear, chafing or accidental cutting. Because the background art separates the line 29 from the curved slots 26 near apex 70 it is more likely that the line 29, cable or rope could become detached altogether from background art hardware terminator 25 by rolling from the curved slots 26 with possible catastrophic results.

Figure 2:
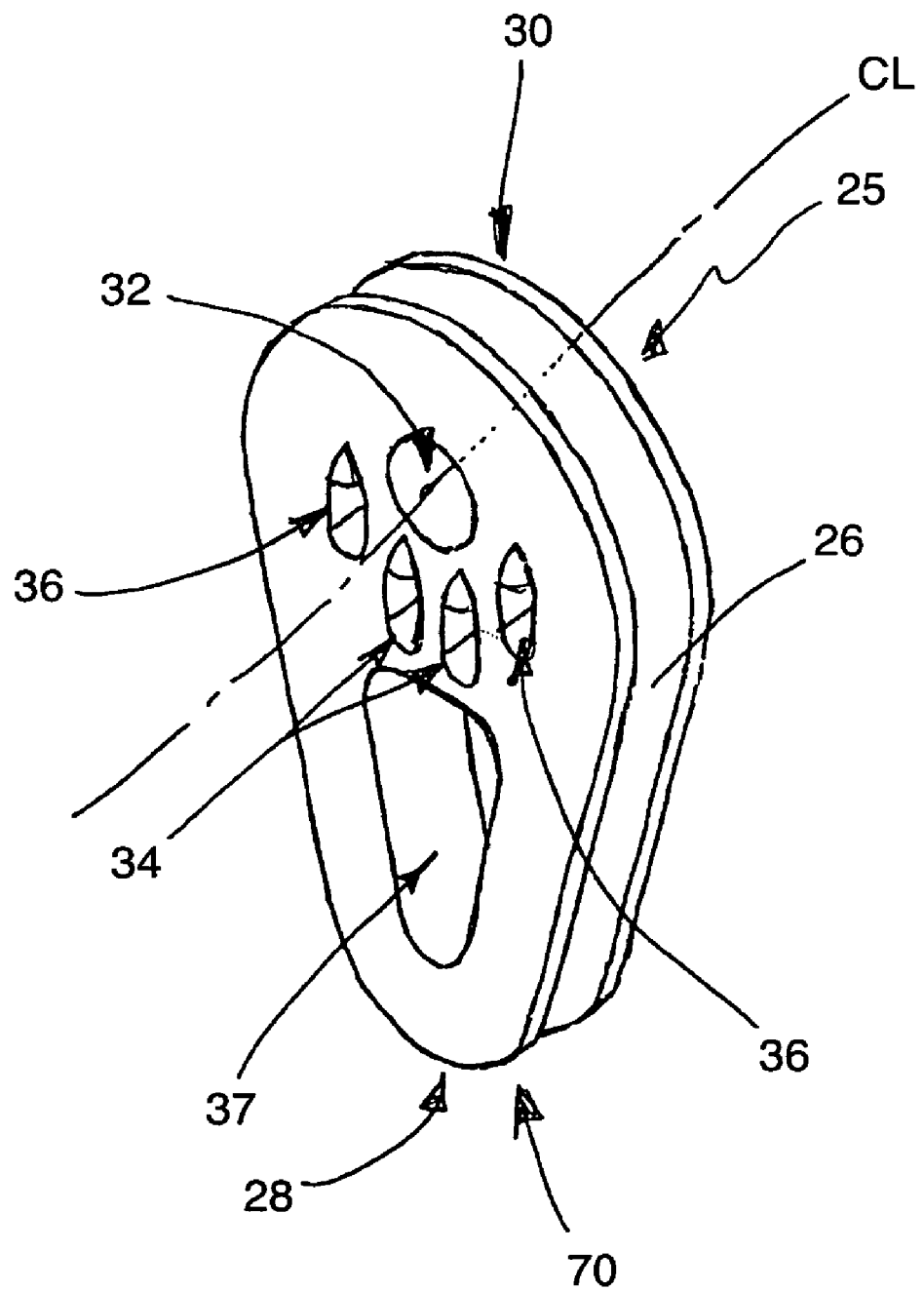
FIG. 2 shows a perspective view of one embodiment of a terminator.
Figure 3:
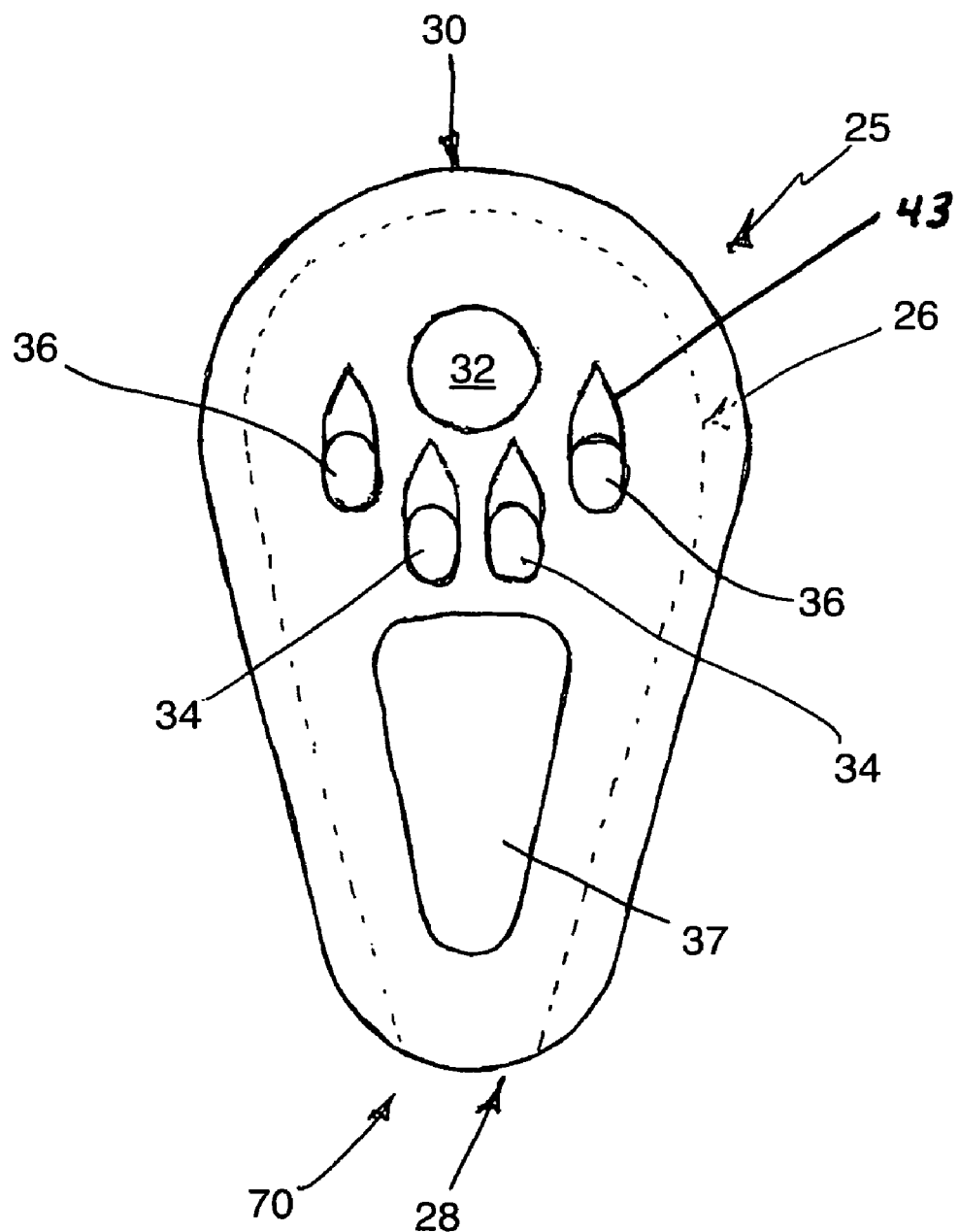
FIG. 3 shows a front view of one embodiment of a terminator.

FIG. 1 shows the applicant's device where the line 29 is housed relatively deeply within the terminator 25 curved slot 26 (FIGS. 2,3). The deepness of curved slot 26 is beneficial in that this protects a large section of the line 29 as it wraps around the terminator 25, thus protecting the line 29 from excessive chafing, UV aging, premature wear and accidental cutting. The applicant's curved slot 26 is also much deeper as compared to the background art and helps prevent the line 29 from rolling from the curved slot 26. The applicant's curved slot 26 is cut such that at least one half of the diameter of the line 29 is contained within the curved slot 26. FIG. 1 shows one possible attachment method utilizing the applicant's hardware, a terminator 25 and distributor 31.

FIG. 2 shows a perspective view of one embodiment of the terminator 25 shown in FIG. 1. The terminator 25 is approximately tear drop shaped and has a pre-determined thickness which is governed by the diameter of the rope, line or cable for which it is designed. The terminator 25 in these embodiments, can be machined from aluminum, but other various ferrous, non ferrous metals or polymers may be used. The thickness varies because the depth and diameter of the curved slot 26 is sized based on the diameter of the rope, line or cable for which it is intended to be used.

The curved slot 26 extends almost all the way around the perimeter of the terminator 25 but not extending completely around the top 28. Near the bottom 30 is located an attachment hole 32. The attachment hole 32 can have a sleeve 35 (not shown) to help prevent wear to the circumference of the hole 32 when a fastener such as a bolt is used to affix the terminator 25 to another connector or fixed object (other fasteners could obviously be used). Between the hole 32 and the top 28 are located a plurality of slots, in this embodiment two mid slots 34 with one end slot 36 on either side, see FIGS. 2, 3. The slots 34, 36 can be centered on a radius relative to the center of attachment hole 32. Terminator 25 also has an opening 37 to reduce the weight of the terminator 25, FIGS. 2, 3.

Figure 4:
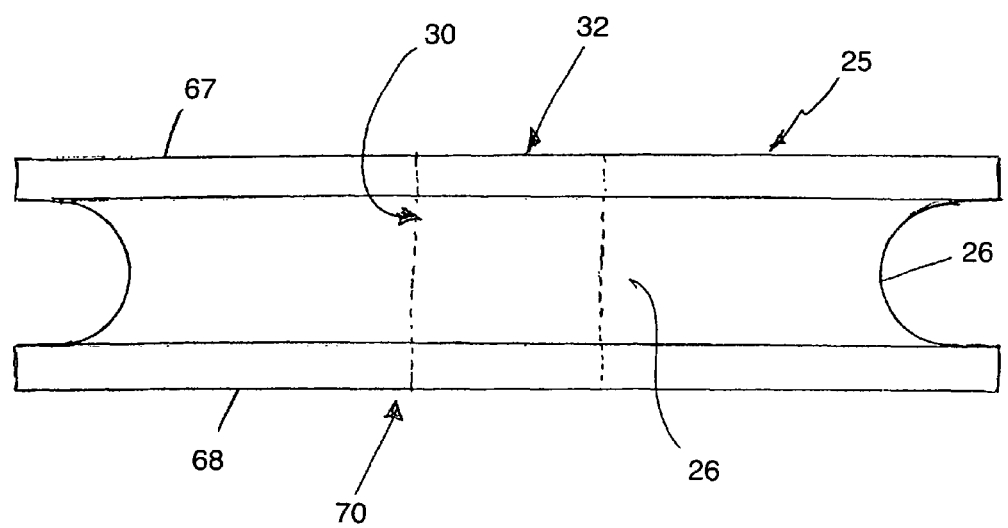
FIG. 4 shows a bottom view of one embodiment of a terminator.

FIG. 4 is a view from the bottom 30 of the terminator 25 showing the profile of the curved slot 26.

Figure 5:
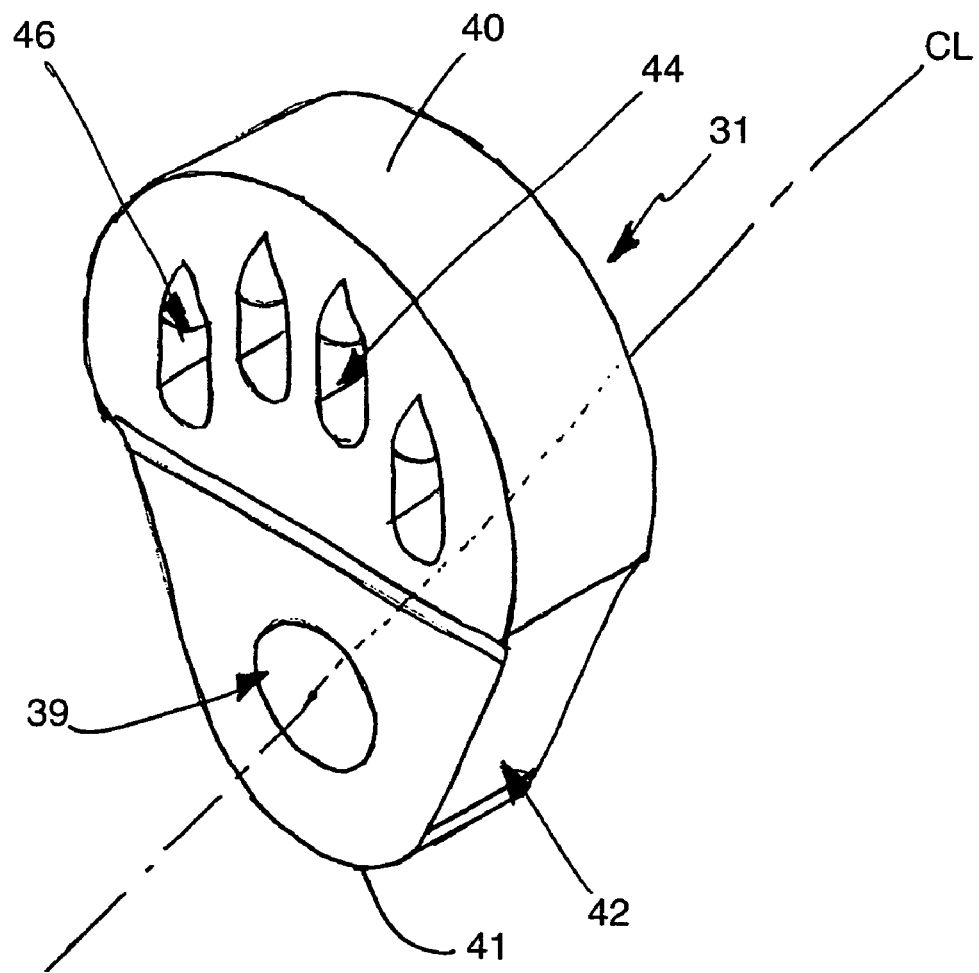
FIG. 5 shows a perspective view of one embodiment of a distributor.
Figure 6:
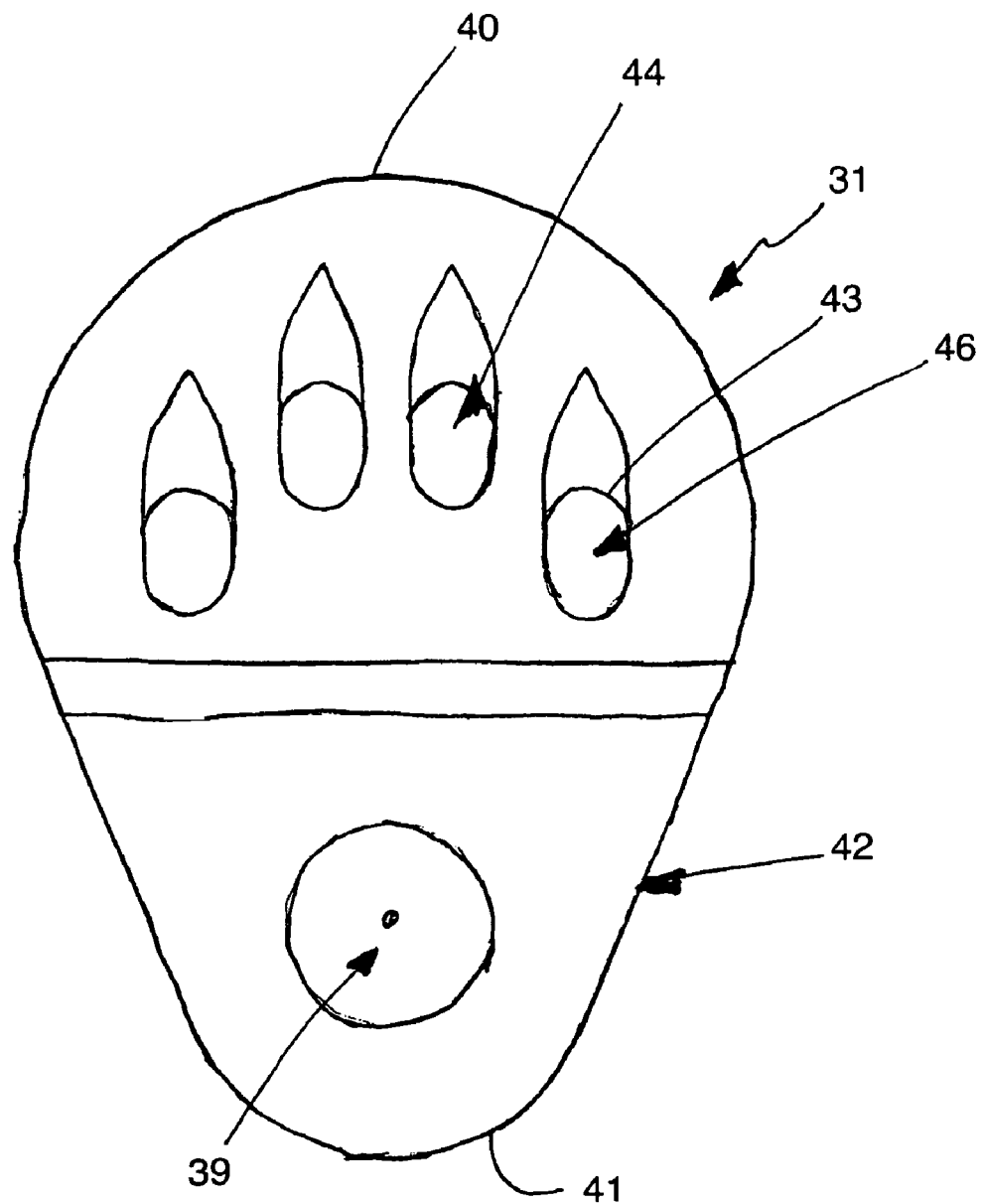
FIG. 6 shows a front view of one embodiment of a distributor.
Figure 7:
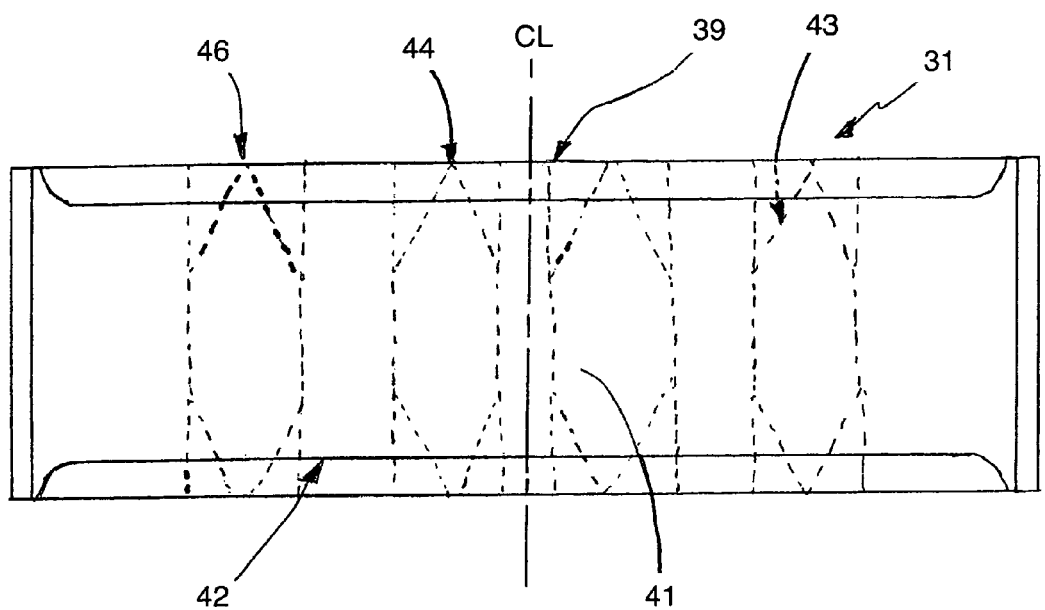
FIG. 7 shows a bottom view of one embodiment of a distributor.
Figure 8:
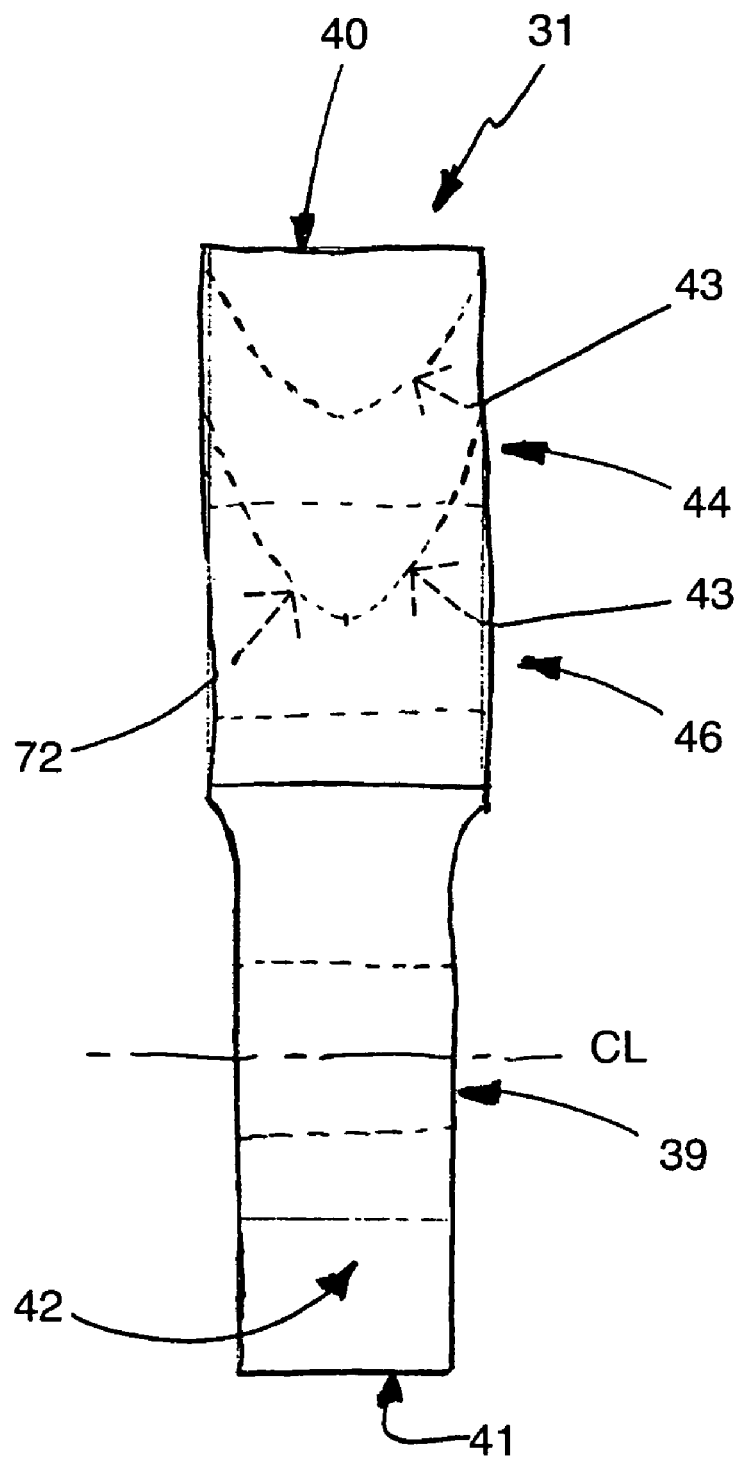
FIG. 8 shows a side view of one embodiment of a distributor.

FIG. 5 shows a detailed perspective view of the distributor 31 from FIG. 1, while FIG. 6 shows a front view of the distributor 31. The distributor 31 could also be attached at hole 39 to another fixture as a user may require and it should be noted that this distributor in FIGS. 5-8 has a male end at the bottom 41. FIG. 7 shows a perspective view detailing the hole 39 and pair of mid slots 44 and end slots 46 for the lashing 27 (not shown). It is noted that the mid slots 44 and end slots 46 are not merely through holes, but are cut in a pattern having a radius 72 (FIG. 8). This is important so that the lashing 27 can be inserted through the distributor 31 and kept in smooth contact with the inner surface 43 of the mid and end slots 44, 46, see FIGS. 7, 8. The radius 72 of the inner surface 43 of the mid and end slots 44, 46 is pre-determined depending upon the diameter of the lashing 27 that will be used to tie the distributor 31. If the radius 72 is too small then kinking of the lashing 27 occurs which can damage the fibers of lashing 27.

The radius 72 is preferably a 5-1 ratio to the diameter of the lashing 27 for which it will be used. This ratio prevents the line from kinking and thus losing strength.

Figure 9:
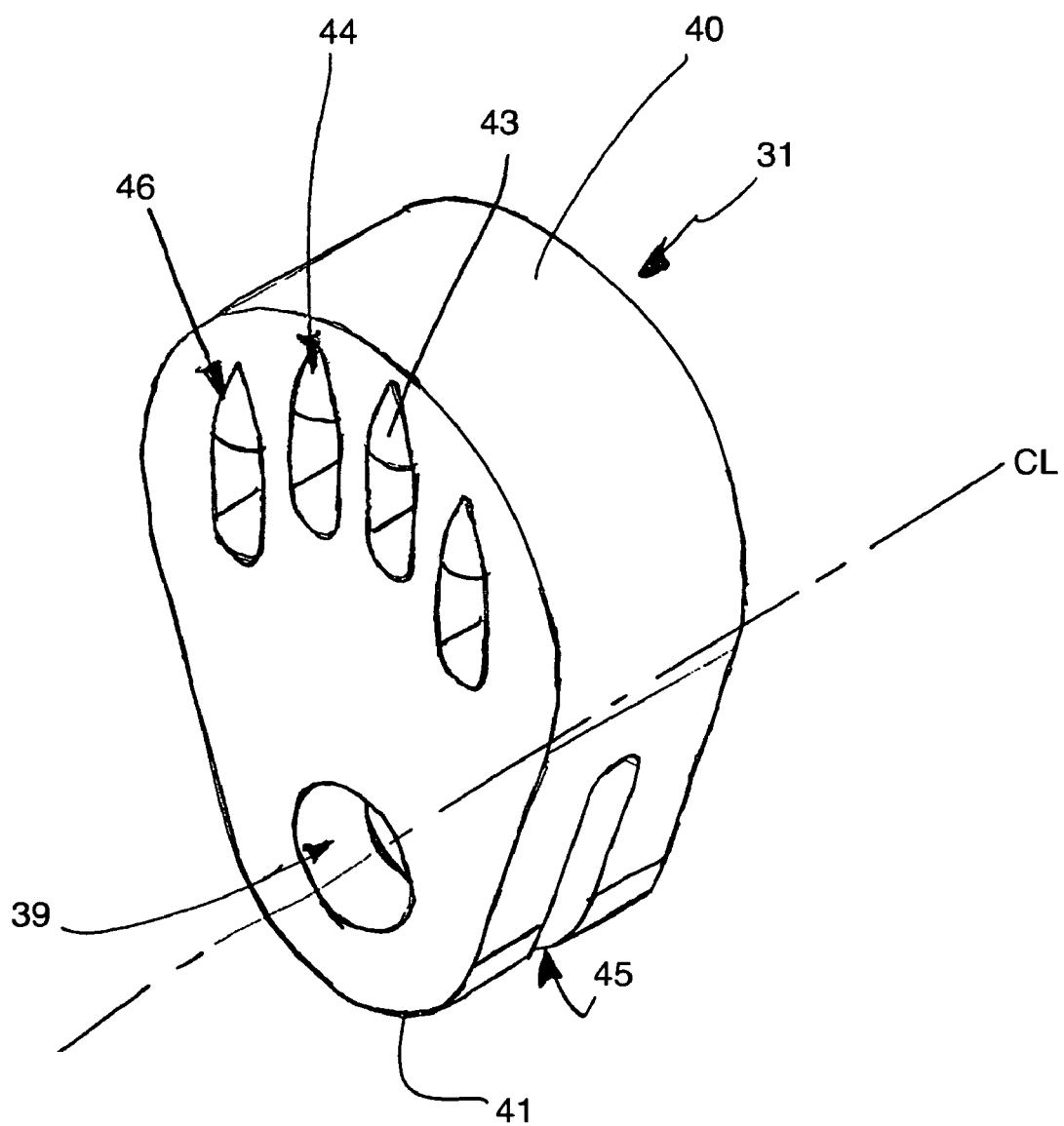
FIG. 9 shows a perspective view of a second embodiment of the distributor.
Figure 10:
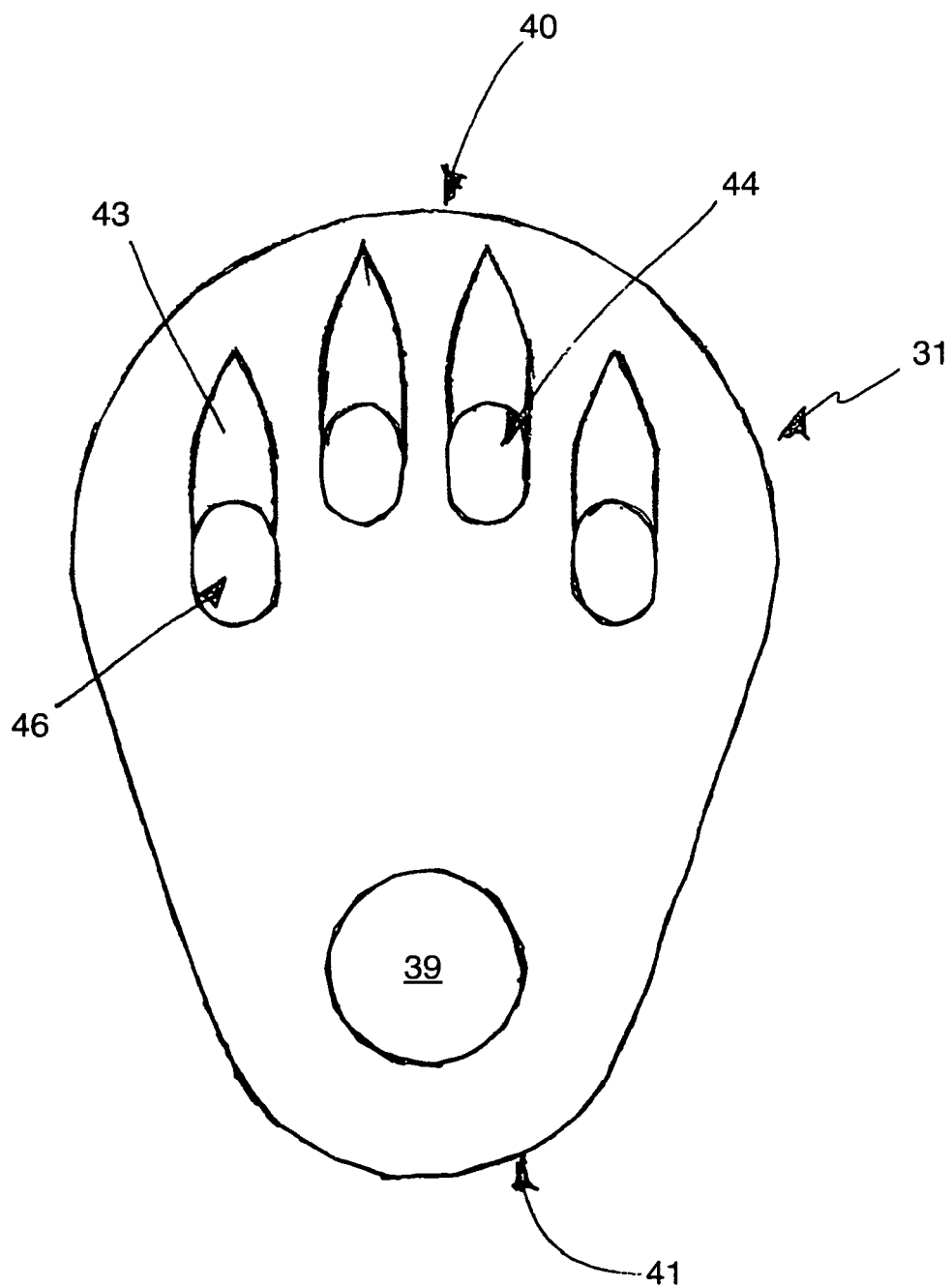
FIG. 10 shows a front view of one embodiment of the distributor.
Figure 11:
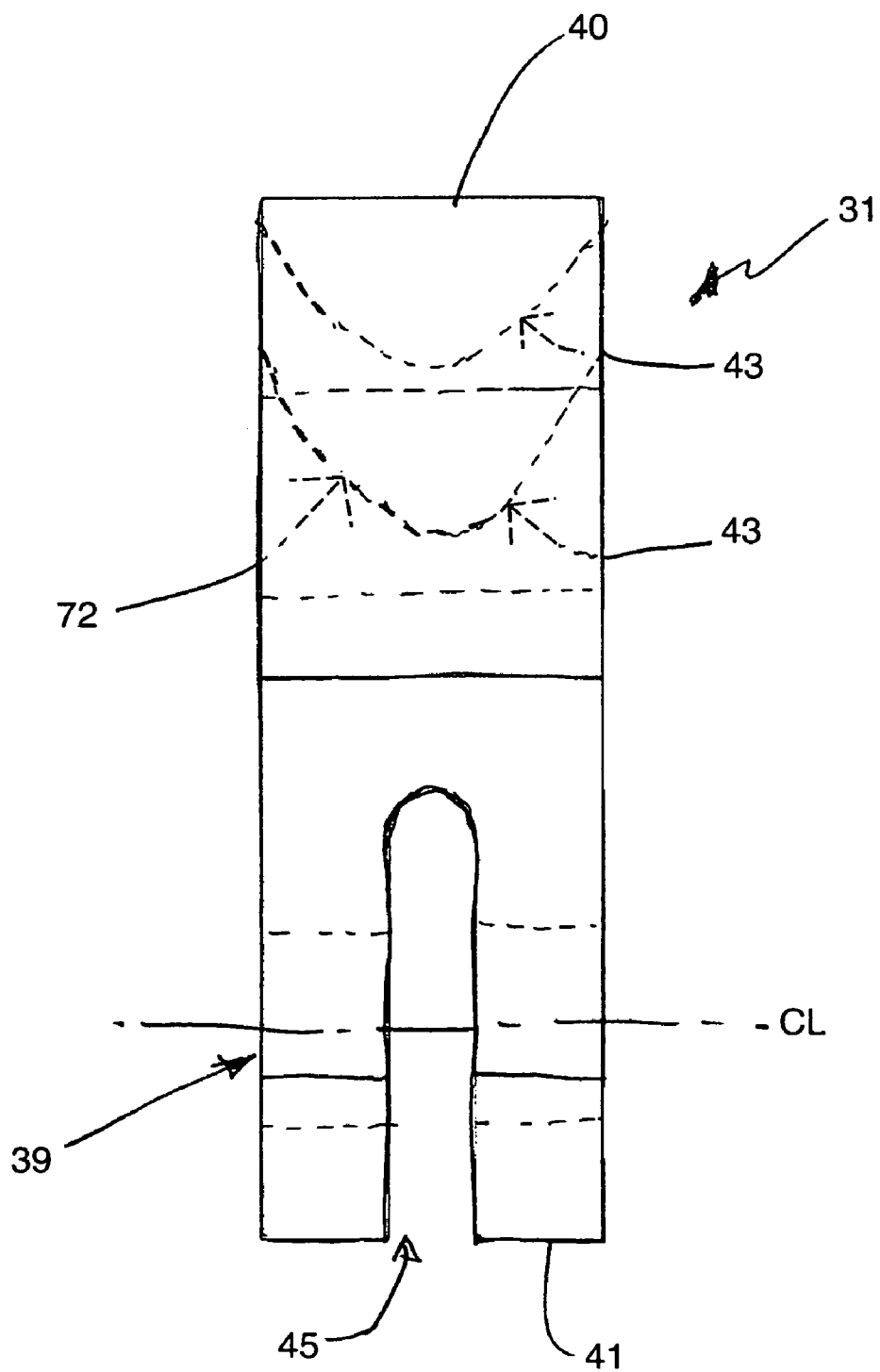
FIG. 11 shows a side view of one embodiment of the distributor.
Figure 12:
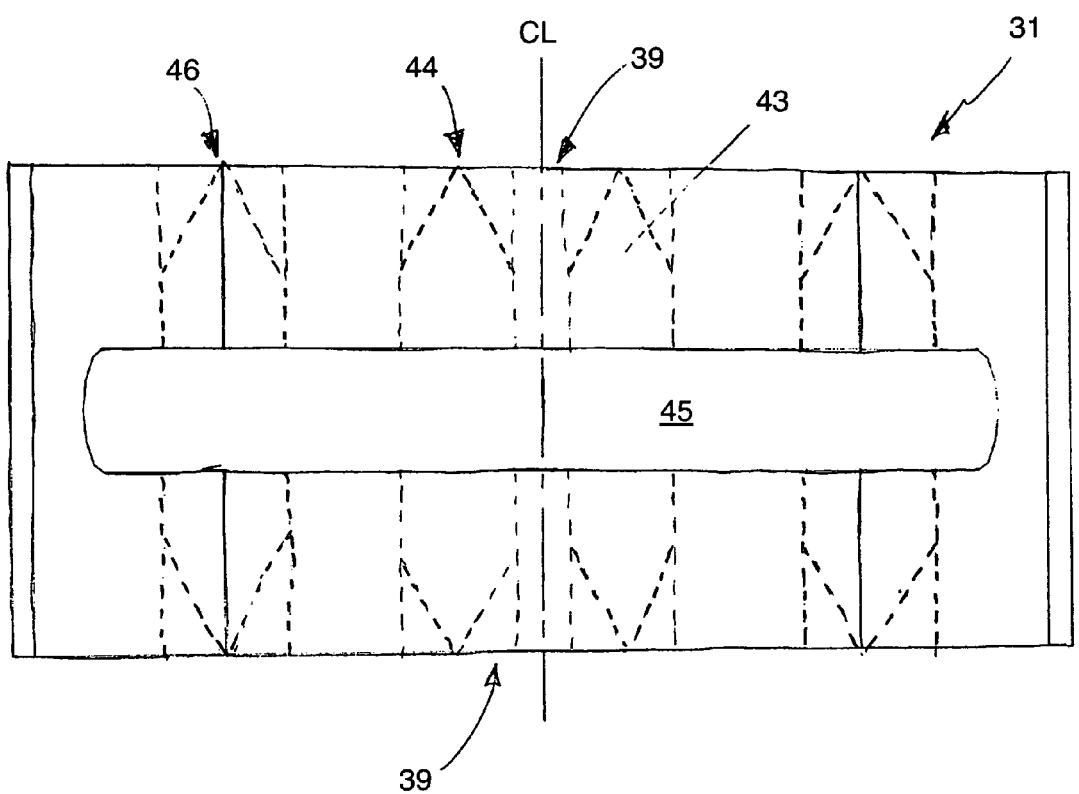
FIG. 12 shows a bottom view of one embodiment of the distributor.

FIG. 9 shows a perspective view of an alternative distributor 31. In this embodiment, at the bottom 41, there is a slot 45 for attachment of additional hardware (not shown) via a pin or bolt and sleeve 35 (not shown) through hole 39, FIGS. 9, 10, 11. This distributor 31 would allow an alternative attachment for the bottom 41 while allowing lashing 27 to be routed through the end slots 46 and middle slots 44. The slots 44, 46 are not merely straight holes but have a radius 72 to the inner surface 43 (FIG. 11) so that the lashing 27 can distribute the load evenly along inner surface 43. Again, the radius of the surface 43, is sized depending upon the diameter of the lashing 27 that will be used. FIG. 12 shows a view of the bottom 41 showing the slot 45.

Figure 13:
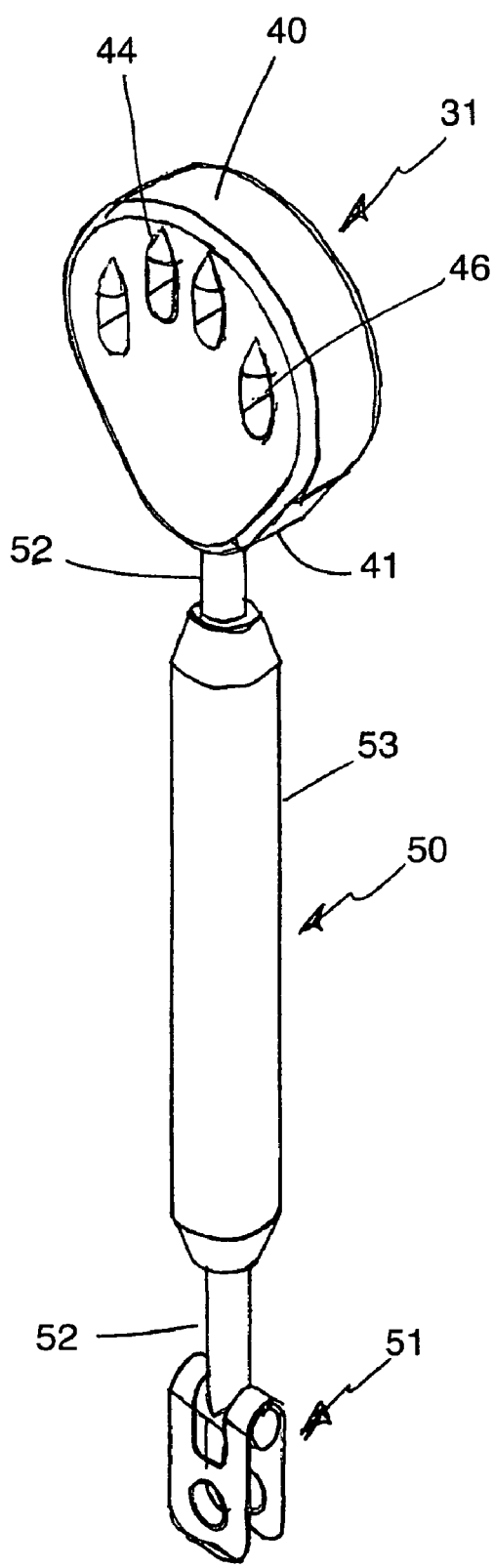
FIG. 13 shows a perspective view of one embodiment of a turnbuckle distributor.
Figure 14:
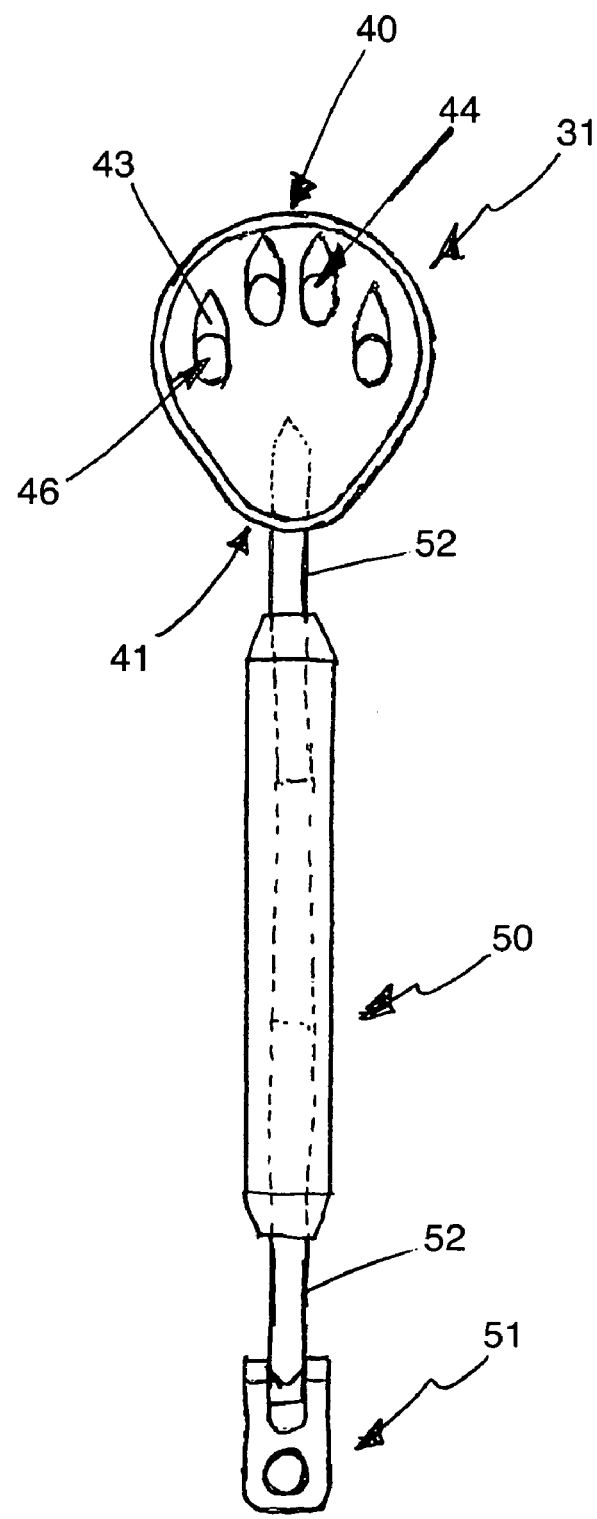
FIG. 14 shows a front view of one embodiment of a turnbuckle distributor.

FIG. 13 shows a perspective view of an alternative distributor 31, where this distributor 31 is attached to a threaded rod 52 which in turn is connected to turnbuckle 50 having a threaded sleeve 53. On the opposite end of the sleeve 53 is a second threaded rod 52 and this can be affixed to many different types of connectors 51, where connector 51 is but one example of a connector. The user can then thread the lashing 27 (not shown) through each of the end slots 46 and middle slots 44 (FIGS. 13 & 14) and tie the lashing (not shown) to wherever the user needs it tied. The sleeve 50 can then be turned to tighten or loosen the length of the turnbuckle 50. As in the earlier embodiments of the distributor 31, the end slots 46 and middle slots 44 have a radius on the inner surface 43 (not shown) such that the lashing 27 optimally contacts the inner surface 43 and the lashing is less likely to fail prematurely as has bee described prior.

Figure 15:
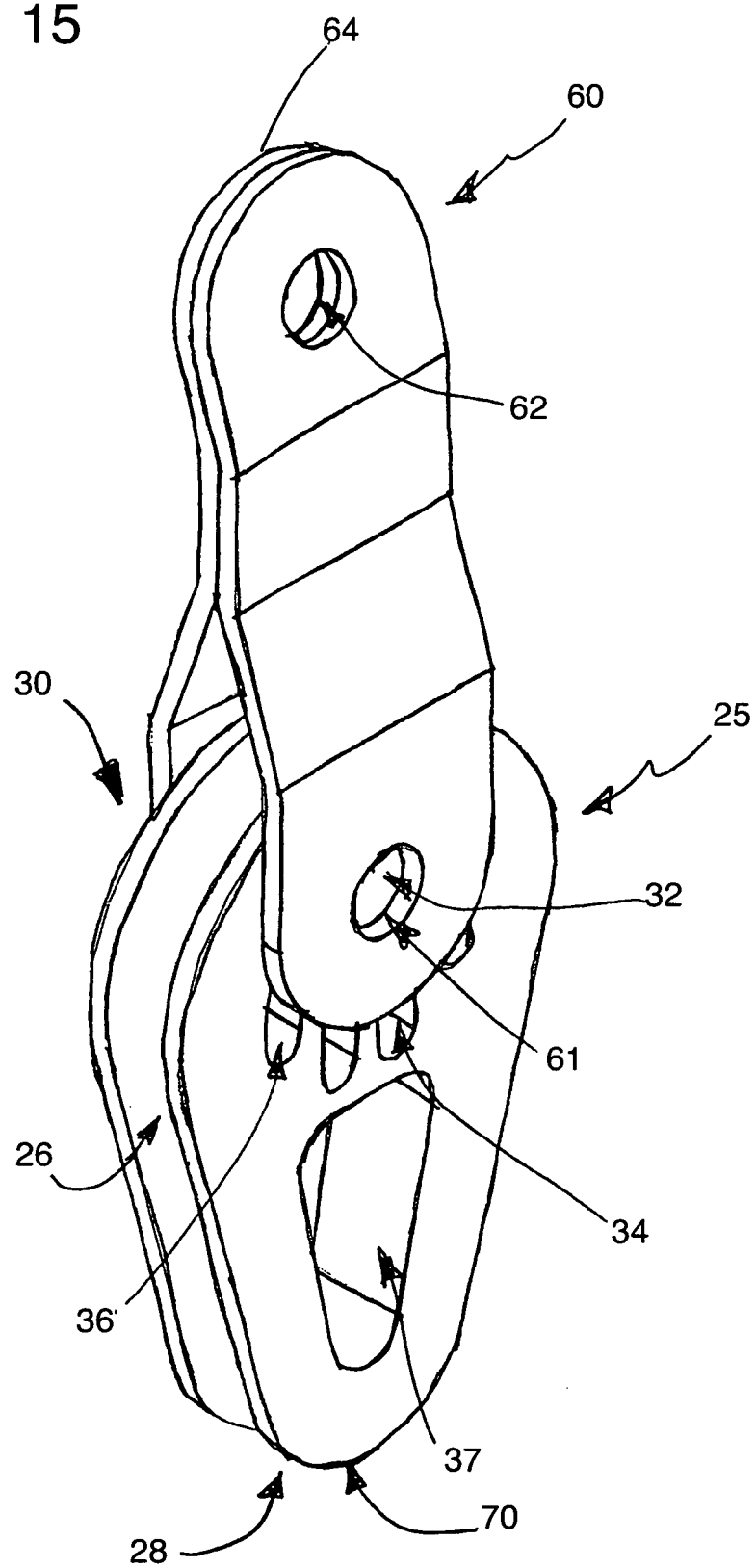
FIG. 15 shows a perspective view of one embodiment of a asymmetric bracket and terminator.

FIG. 15 shows one embodiment of the terminator 25 attached to a bracket 60. The bracket 60 would be attached to the terminator 25 with a bolt or fastener in first hole 61 of the bracket 60 and attachment hole 32 of the terminator 25. A sleeve 35 (not shown) could also be used as has been explained in prior embodiments.

The terminator 25 can be attached to lashing 27 as has been explained prior via end slots 36 and mid slots 34 or as shown in FIG. 15, can be attached via attachment hole 32, FIG. 15, 16.

Figure 16:
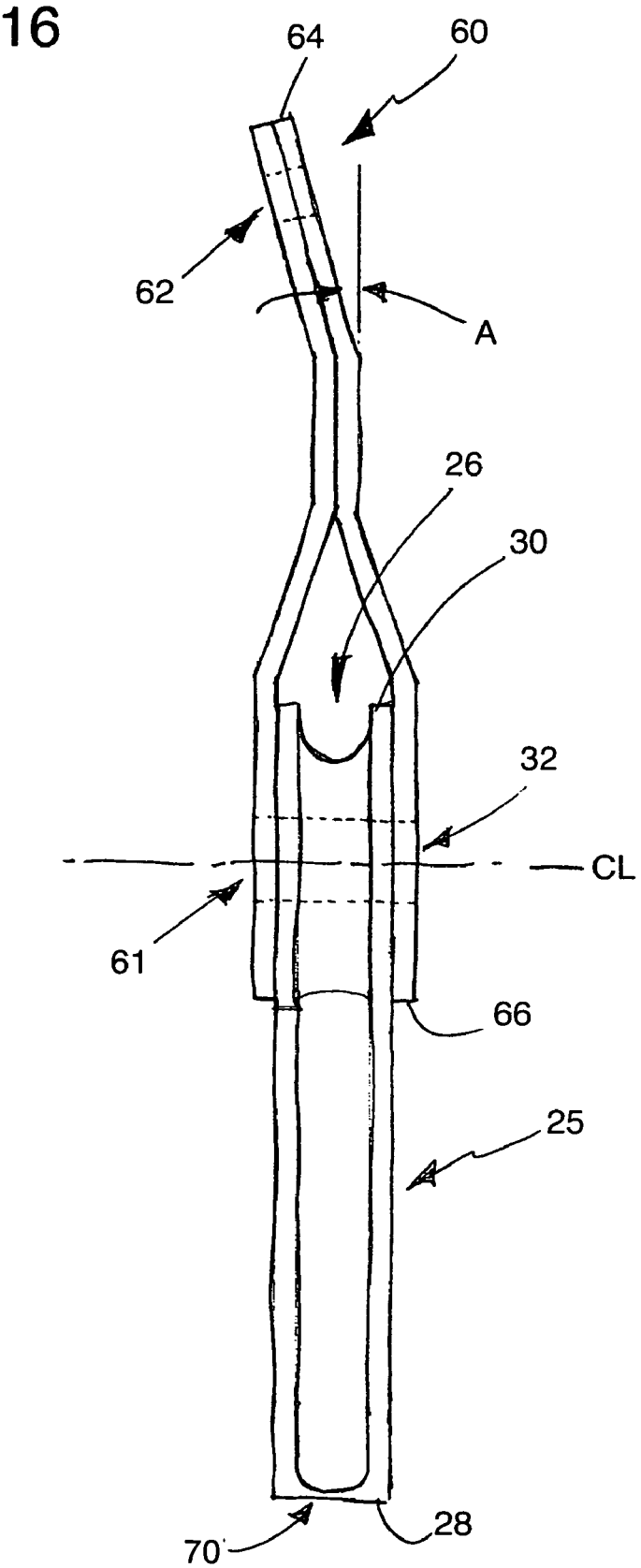
FIG. 16 shows a side view of one embodiment of an asymmetric bracket and terminator.
Figure 17:
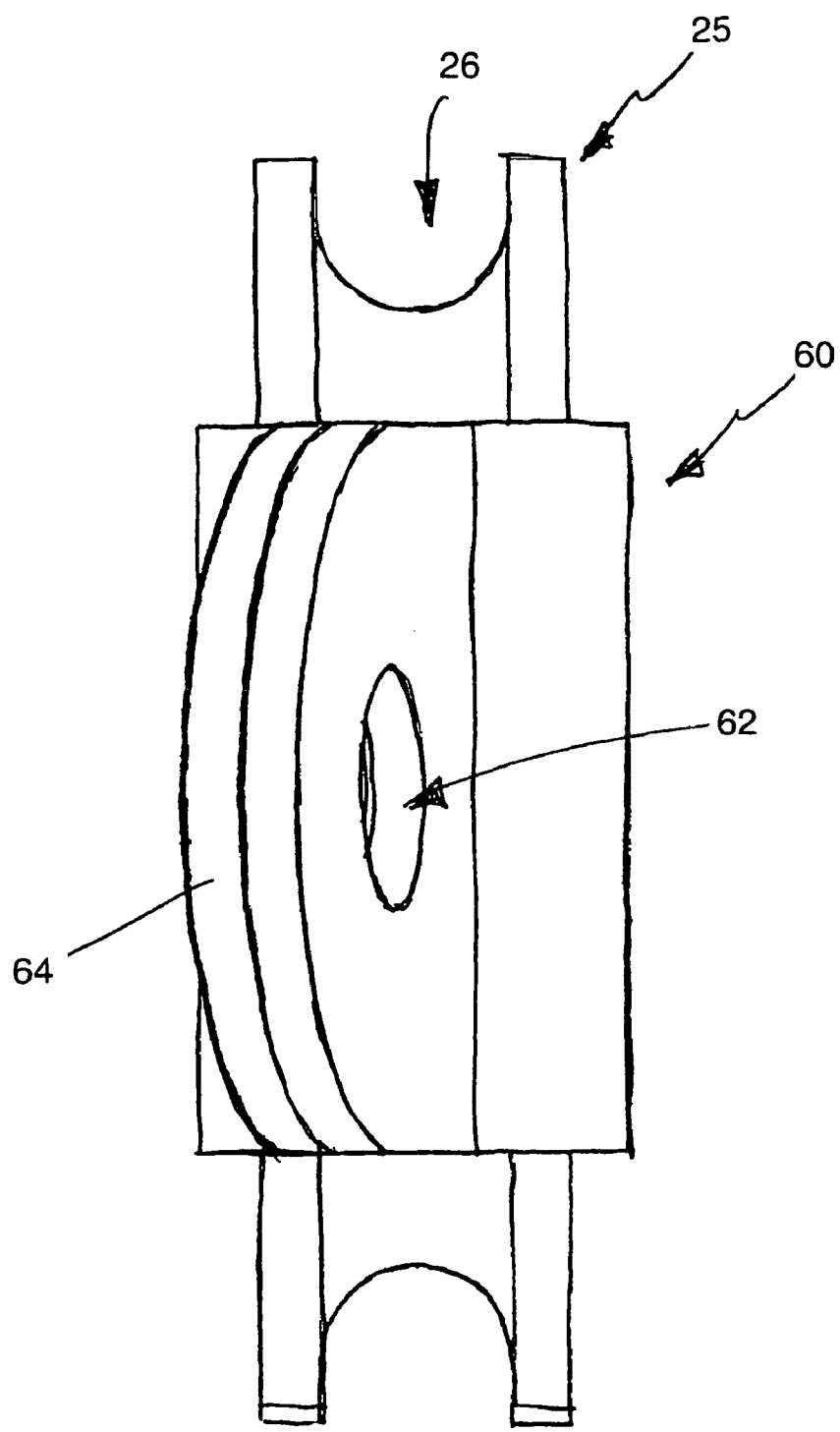
FIG. 17 shows a top view of one embodiment of an asymmetric bracket and terminator.
Figure 18:
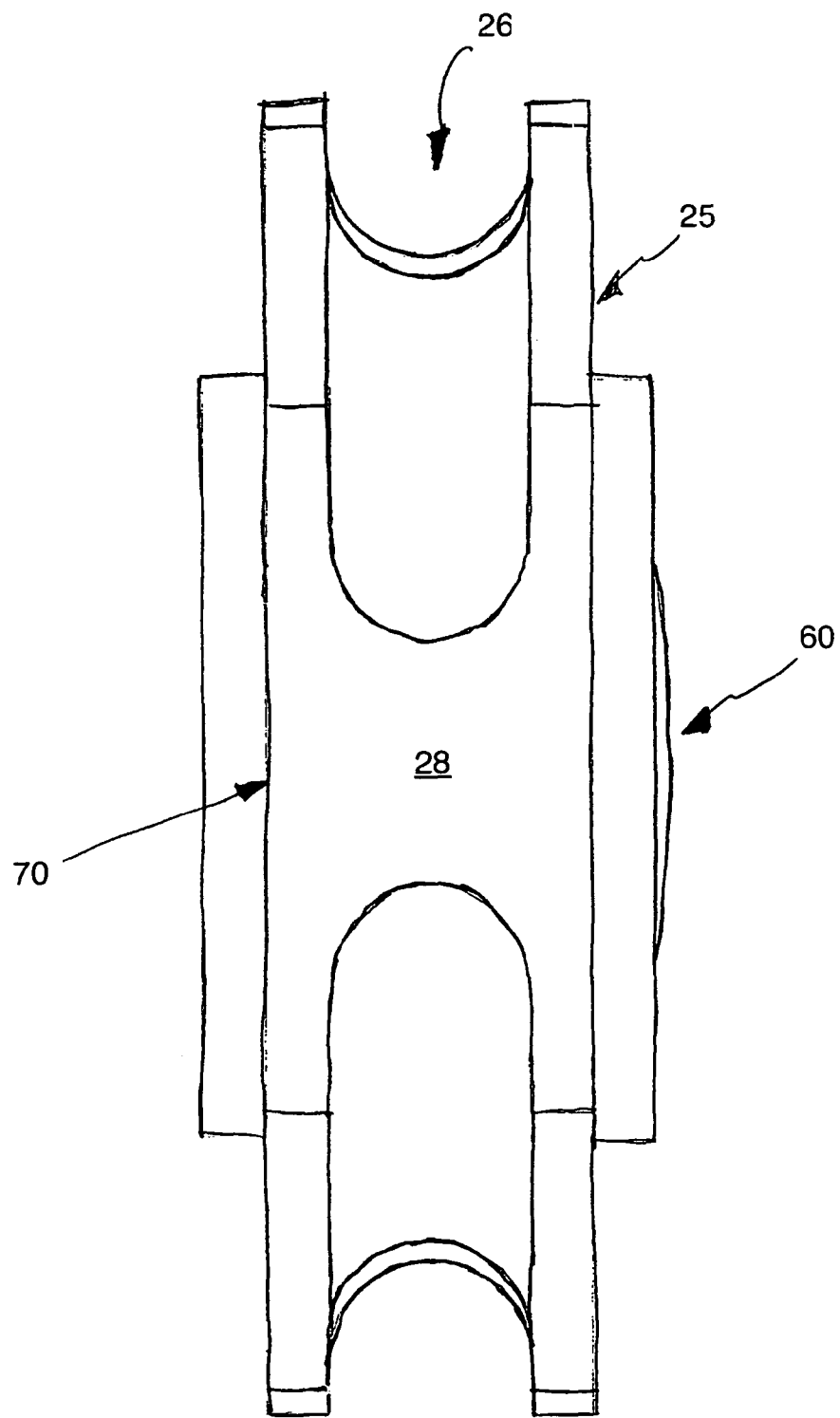
FIG. 18 shows a bottom view of one embodiment of an asymmetric bracket and terminator.

The bracket 60 in these embodiment extends over the bottom 30 of the terminator 25, FIG. 16. As can be seen in FIG. 16, this embodiment of the bracket 60 has an angle A from the vertical. Angle A can be almost any angle or no angle, or vertical, such that the top 64 of the bracket 60 can be attached via second hole 62 to another component based on the user's need. This method can be particularly useful in attaching lines to a mast for example.

The brackets 60 can be manufactured from any ferrous, non-ferrous metal or polymers. Titanium is used primarily because many times brackets such as bracket 60 are used to attach a line to the top of a mast on a sailing vessel. Many times users do not wish to inspect these attachments because of the height and thus the desire to have a strong relatively non corroding material such as titanium for bracket 60 is desirable. Titanium also reduces the weight of these elements and this is desirable for many boaters and others who require strong relatively light weight connectors.

Figure 21:
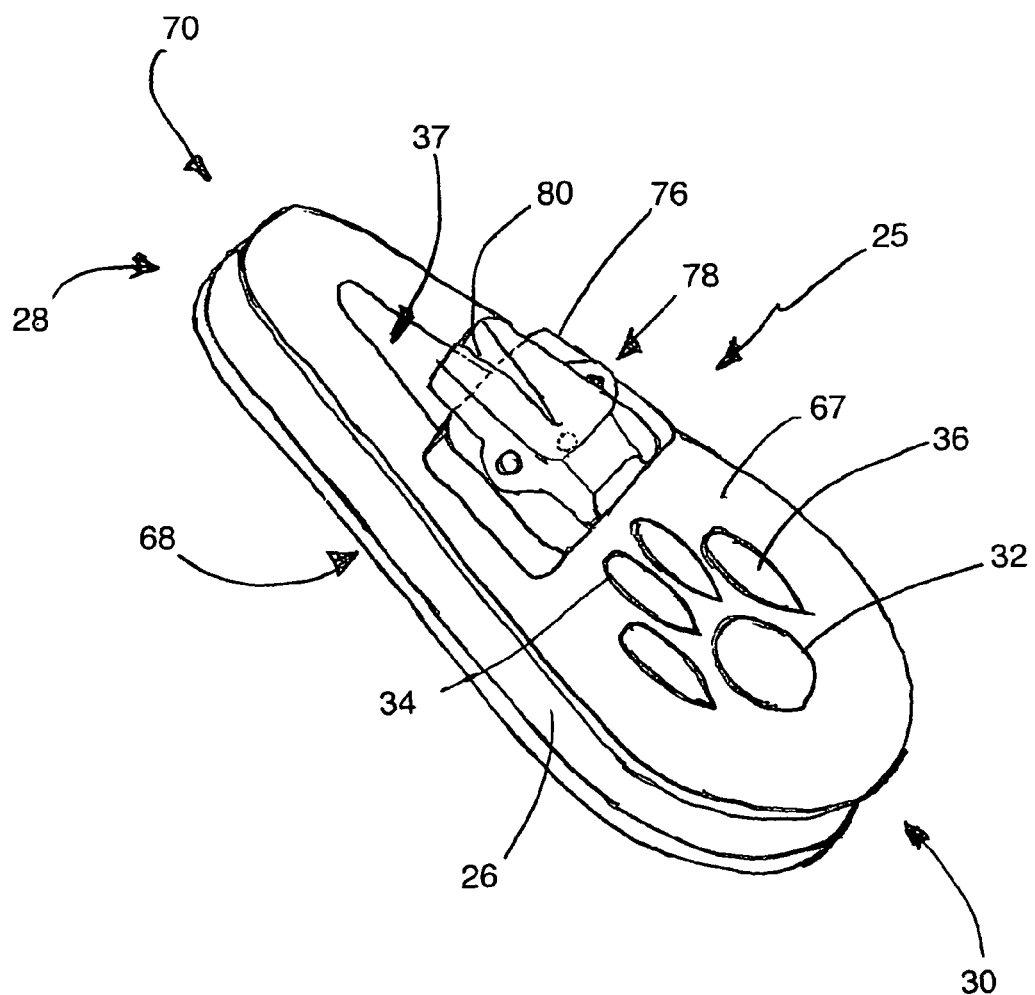
FIG. 21 shows a perspective view of one embodiment of a terminator with a cleat attached.
Figure 22:
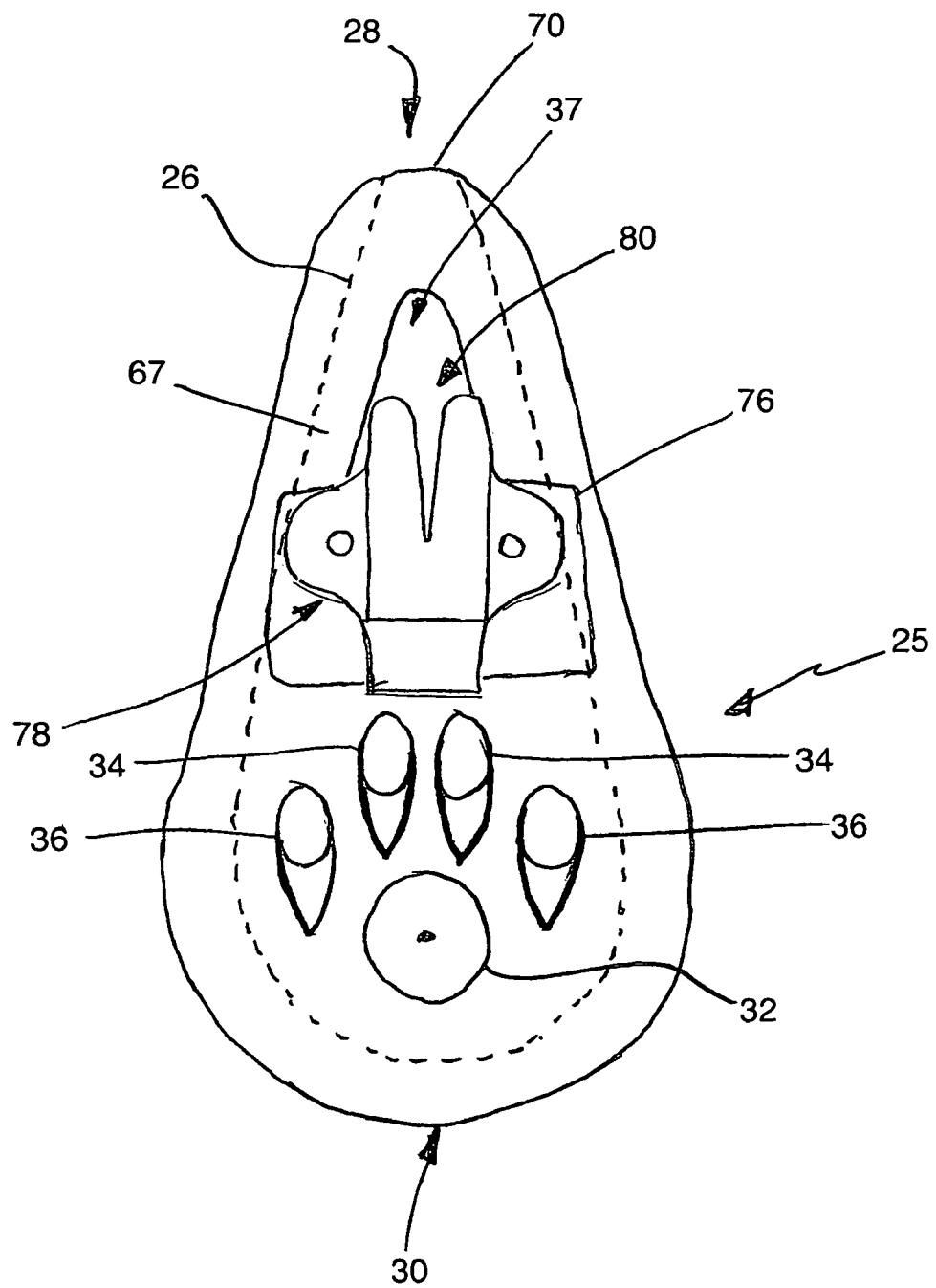
FIG. 22 shows a front view of one embodiment of a terminator with a cleat attached.
Figure 23:
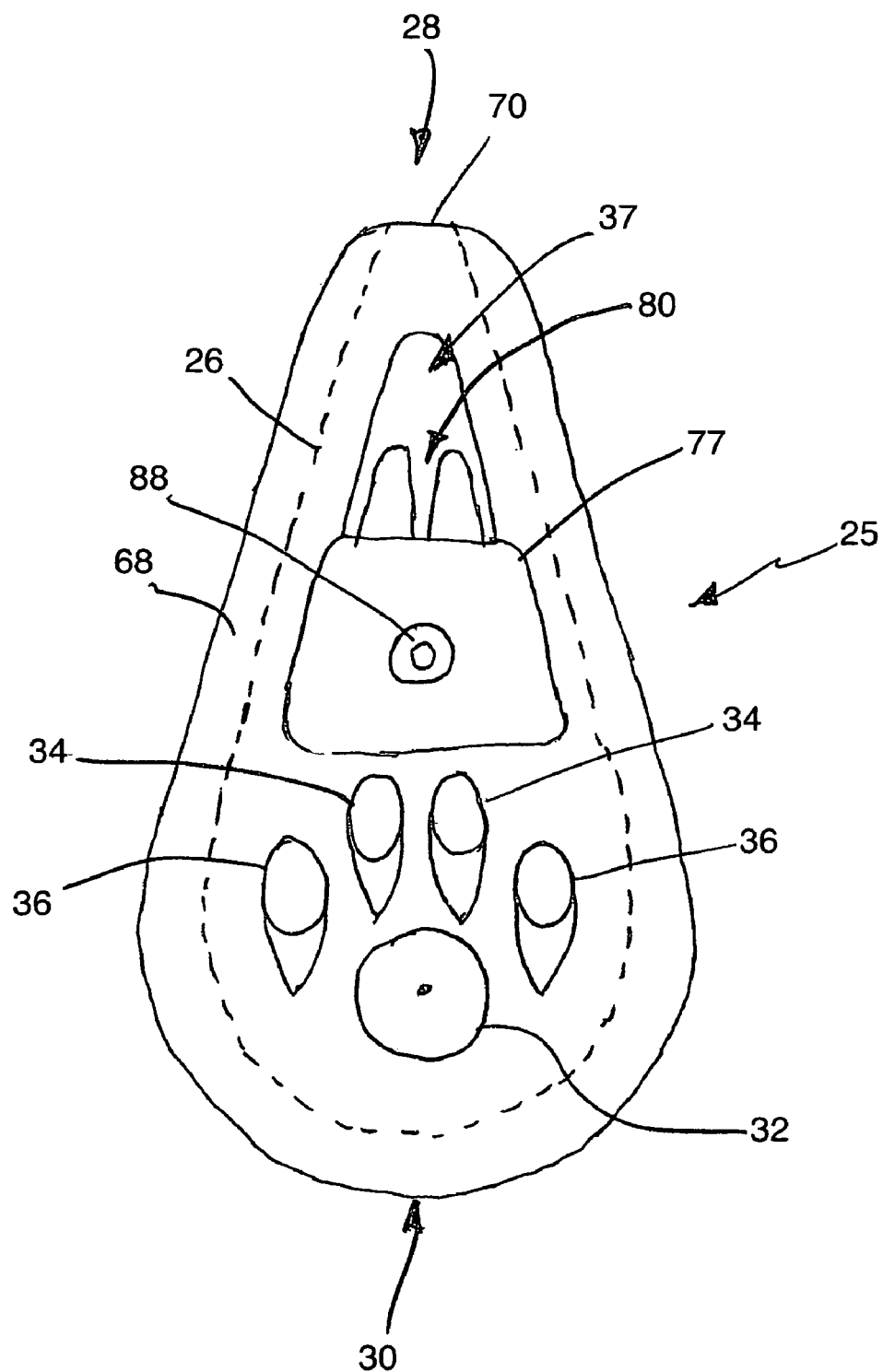
FIG. 23 shows a back view of one embodiment of a terminator with a cleat attached.
Figure 24:
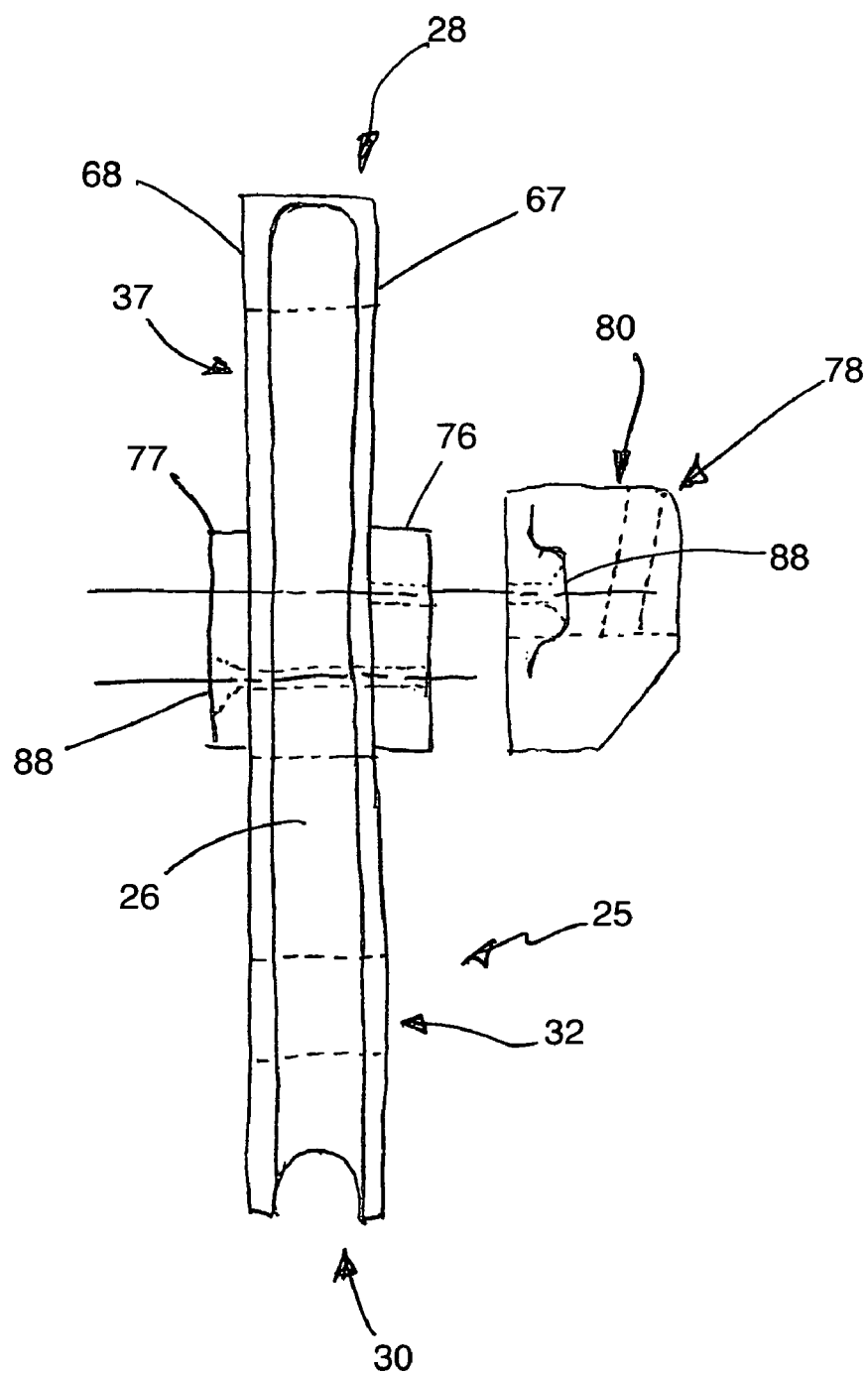
FIG. 24 shows a side view of one embodiment of a terminator and location of a cleat.

FIG. 21 shows a perspective view of a terminator 25 with a cleat 78 attached. The cleat 78 is attached to a first plate 76 which is adjacent to the first side 67 of the terminator 25, FIG. 24. The first plate 76 is secured to a second plate 77 which is adjacent to the second side 68 of the terminator 25. A fastener 88 sandwiches the terminator 25 between first and second plates 76, 77 to provide mounting of the cleat 78 to the terminator 25 as shown in FIGS. 2 & 3.

This embodiment of terminator 25 with cleat 78 is beneficial in that the lashing 27 used to secure line 29 to an anchor point 33 as in FIG. 1, can be tightened and held taut by cleat 78. The lashing 27, instead of wrapping around vertical elements of lashing 27 as shown in FIG. 1, can be fed through opening 37 and into slot 80 of the cleat 78 and pulled tight.

The lashing 27 in slot 80 of cleat 78 can easily be removed by pulling and re-tightened without having to untie and retie the lashing 27 as shown in FIG. 1. This is beneficial in that some synthetic line tends to stretch after splicing and the cleat 78 provides a simple and quick method of adjusting lashing 27 and thereby lengthening or shortening the overall line 29 length.

Figure 25:
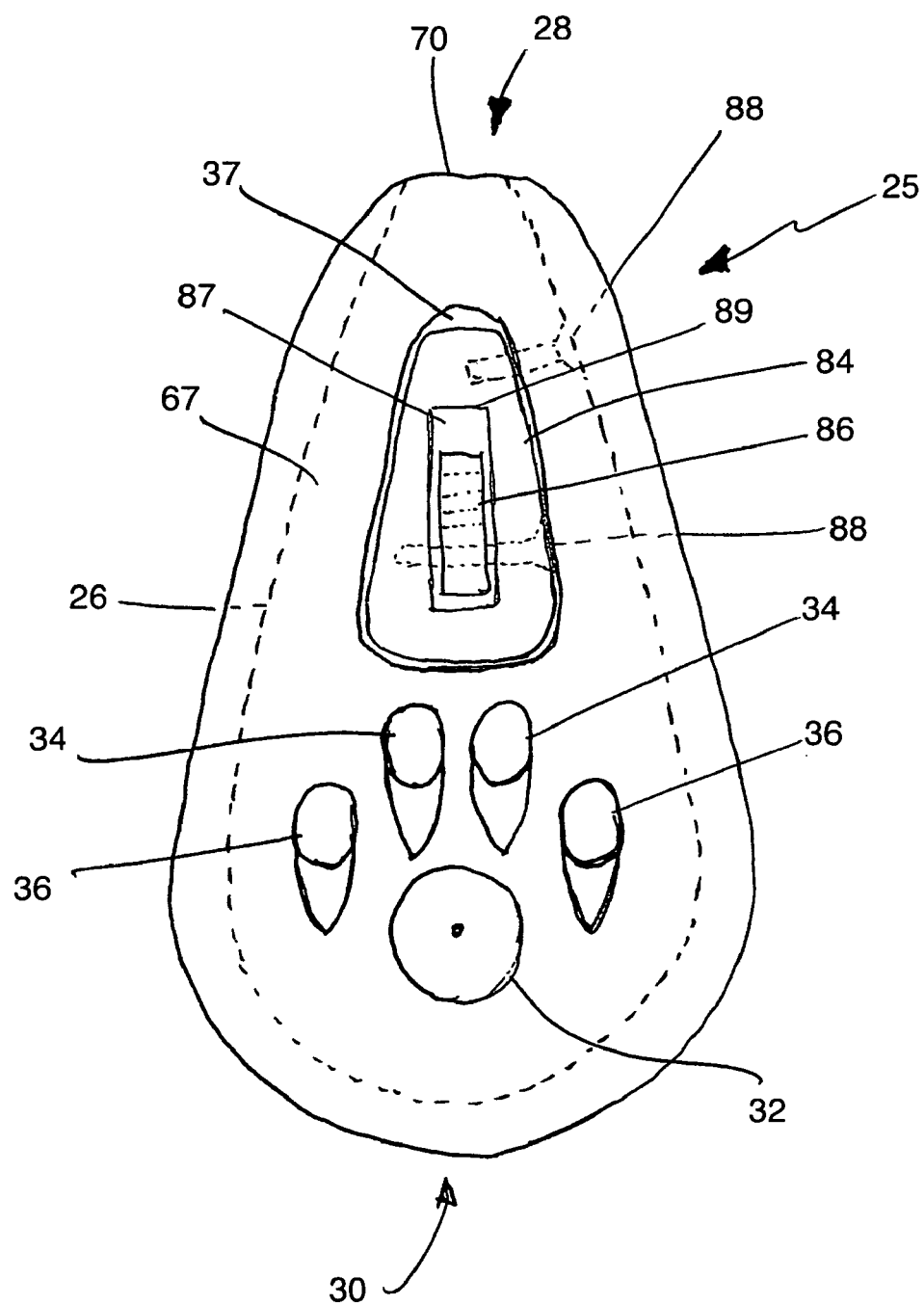
FIG. 25 shows a front view of one embodiment of a terminator with an insert and cam attached.

FIG. 25 shows an alternative terminator 25 housing an insert 84 with a cam 86. The insert 84 can be designed to fit within opening 37 of terminator 25 shown in FIGS. 2 & 3. The insert 84 fits within opening 37 and is retained by fastener 88 which, in this embodiment, sits flush within curved slot 26 so as to not abrade or interfere with line 29 (not shown).

Figure 26:
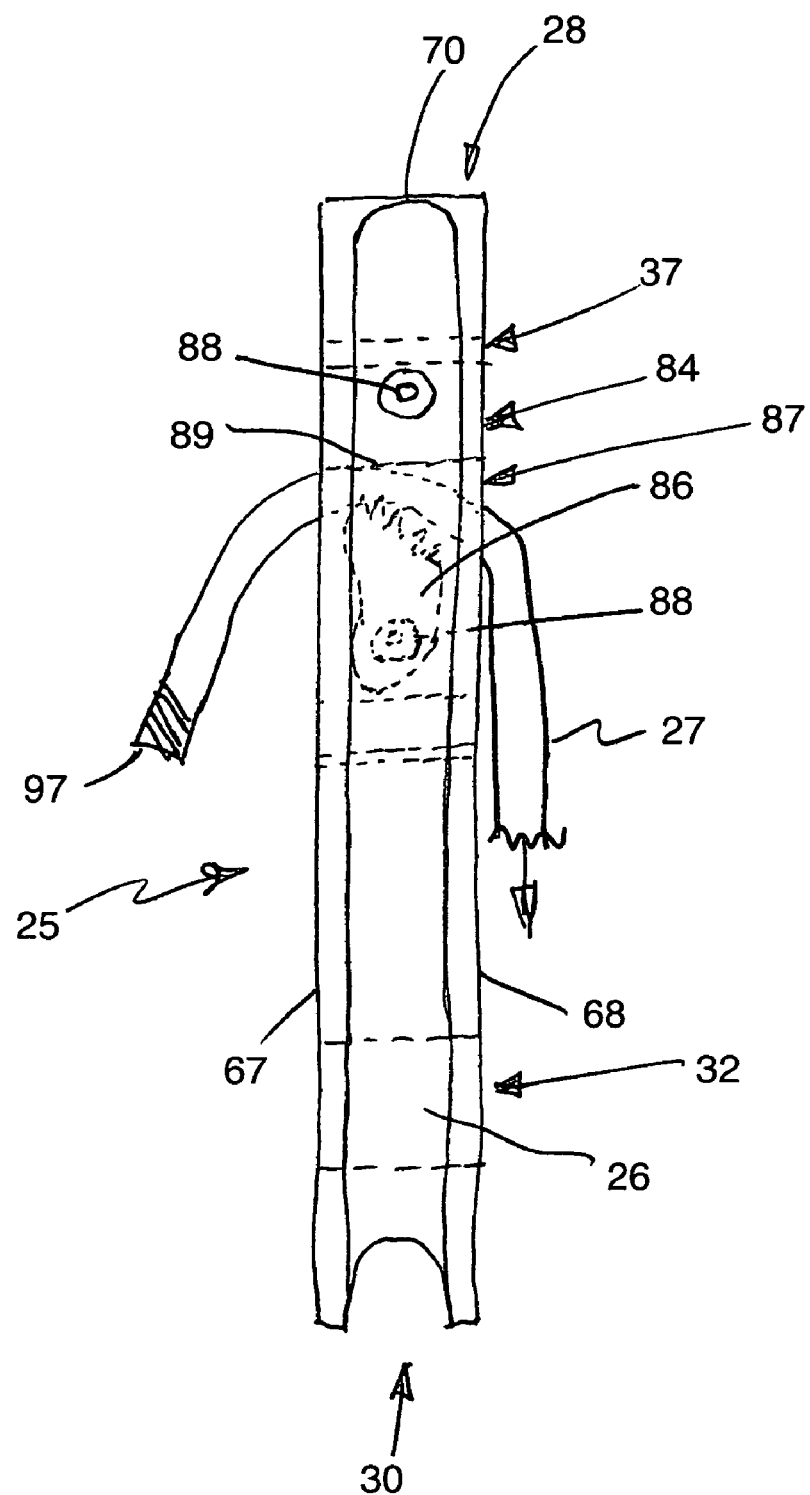
FIG. 26 shows a side view of one embodiment of a terminator with the insert and cam attached.
Figure 27:
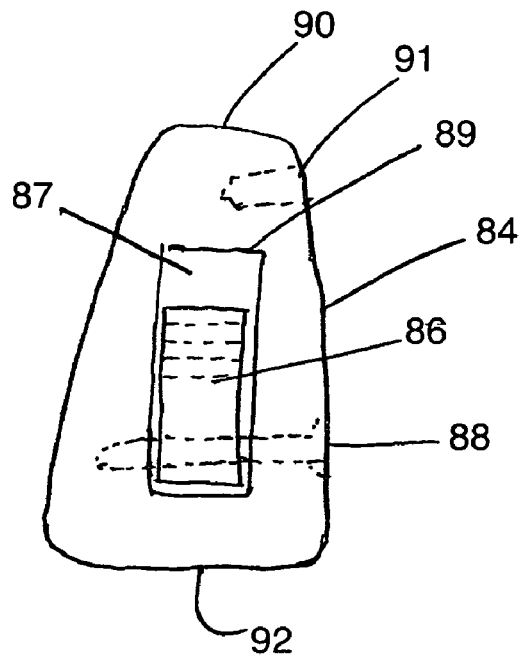
FIG. 27 shows a front view of one embodiment of the insert with cam.
Figure 28:
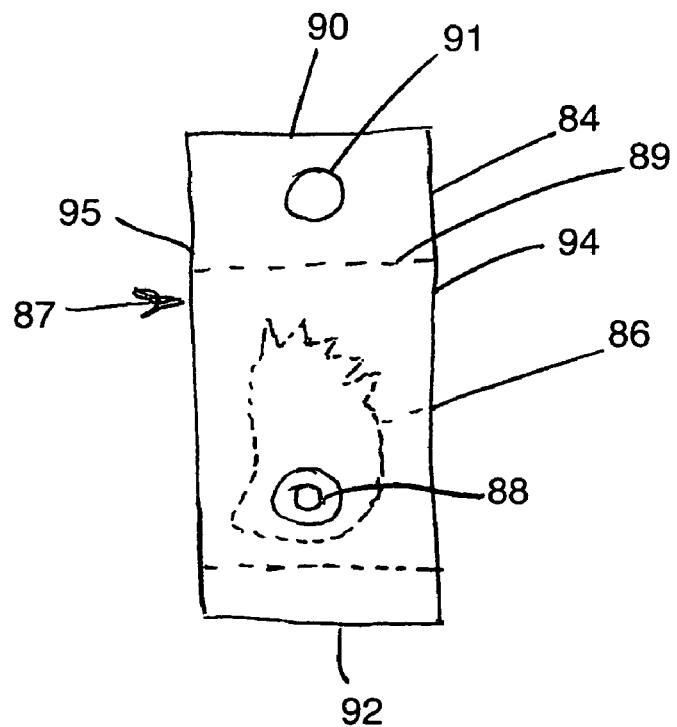
FIG. 28 shows a side view of one embodiment of the insert and cam.

The cam 86 rotates on fastener 88 which retains cam 86 within insert 84, FIGS. 27, 28. The cam 86 provides for the retention of lashing 27, FIG. 26. This allows the user to insert lashing 27 through cam slot 87, or the area between the cam 86 and the insert 84, FIGS. 27, 28. When the lashing 27 is inserted into cam slot 87, the cam 86 rotates on fastener 88 until the slack is removed form lashing 27. When tension is on lashing 27, this pulls the lashing 27 such that the cam 86 rotates clockwise, FIG. 26, and wedges lashing 27 between cam 86 and the interior of insert 84 or surface 89 and lashing 27 is secured. If lashing 27 needs to be tightened, end 97 is pulled which rotates cam 86 counter clockwise, FIG. 26, tightens lashing 27 and when released, lashing 27 is tightened or wedged between cam 86 and surface 89. This is very convenient for tightening lashing 27 and thereby line 29, see FIG. 1.

Cam 86 can also have a spring attached, not shown, to bias cam 86 in a clockwise direction, FIG. 28.

Figure 29:
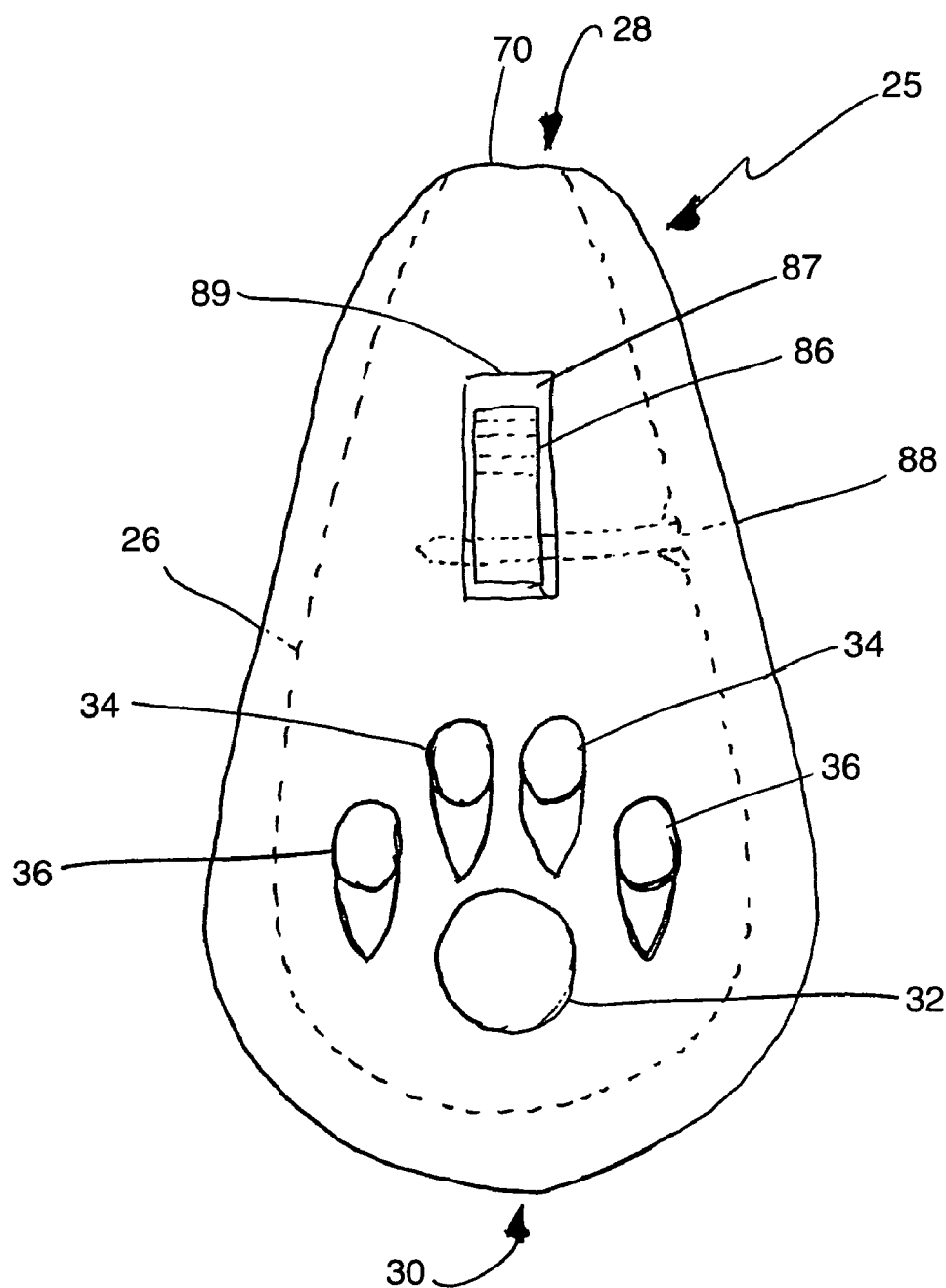
FIG. 29 shows a front view of another embodiment of the terminator with an integrated cam.
Figure 30:
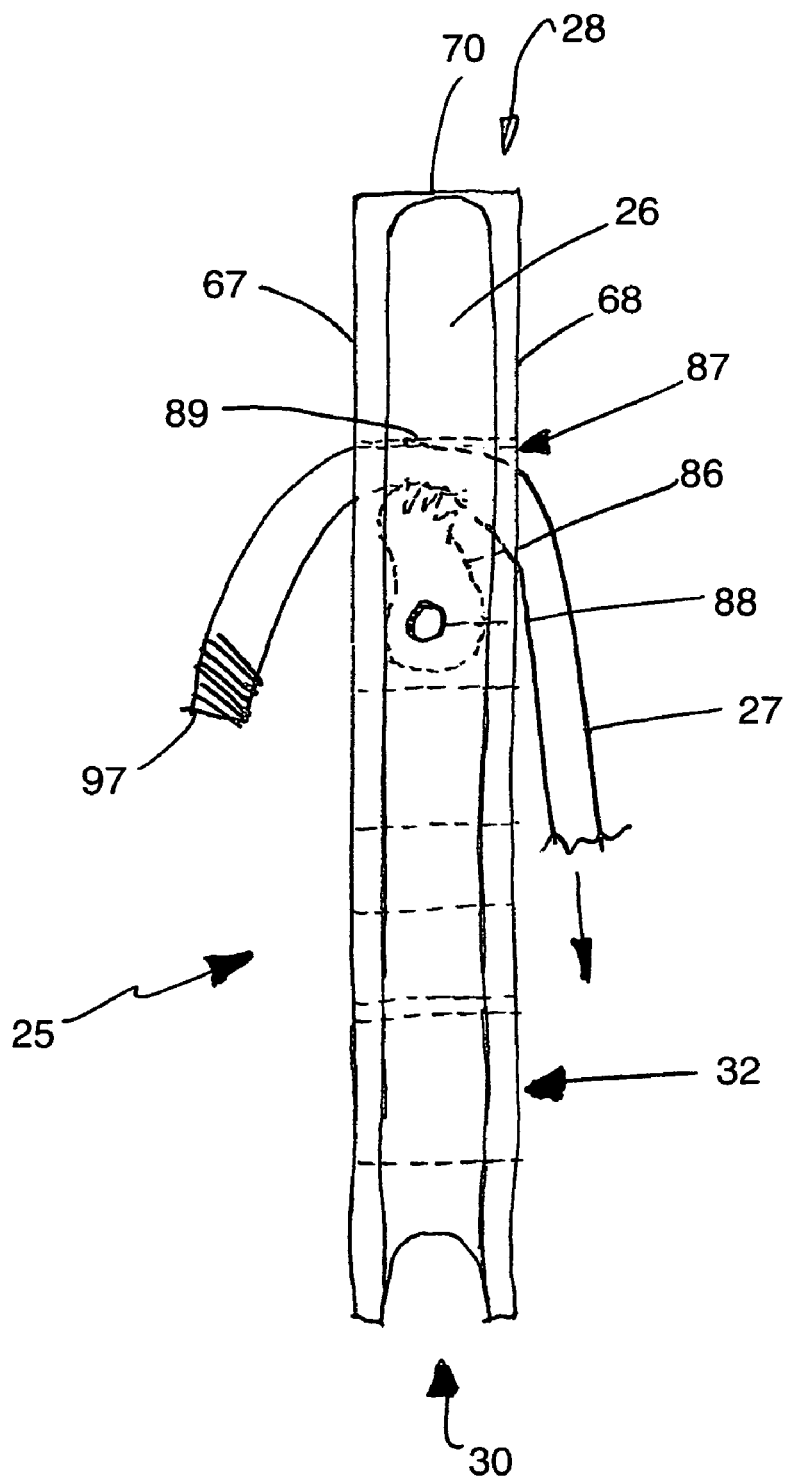
FIG. 30 shows a side view of one embodiment of the terminator and integrated cam.

FIG. 29 shows an alternative embodiment of the terminator 25. In this embodiment, cam 86 is housed within the body of terminator 25. Cam 86 is secured by a fastener 88 which runs form curved slot 26 to provide a pivot and retention of cam 86 within cam slot 87. FIG. 30 shows lashing 27 inserted into cam slot 87 where lashing 27 is retained by the pivoting of cam 86 and wedging of lashing 27 between cam 86 and surface 89 of cam slot 87.

Figure 31:
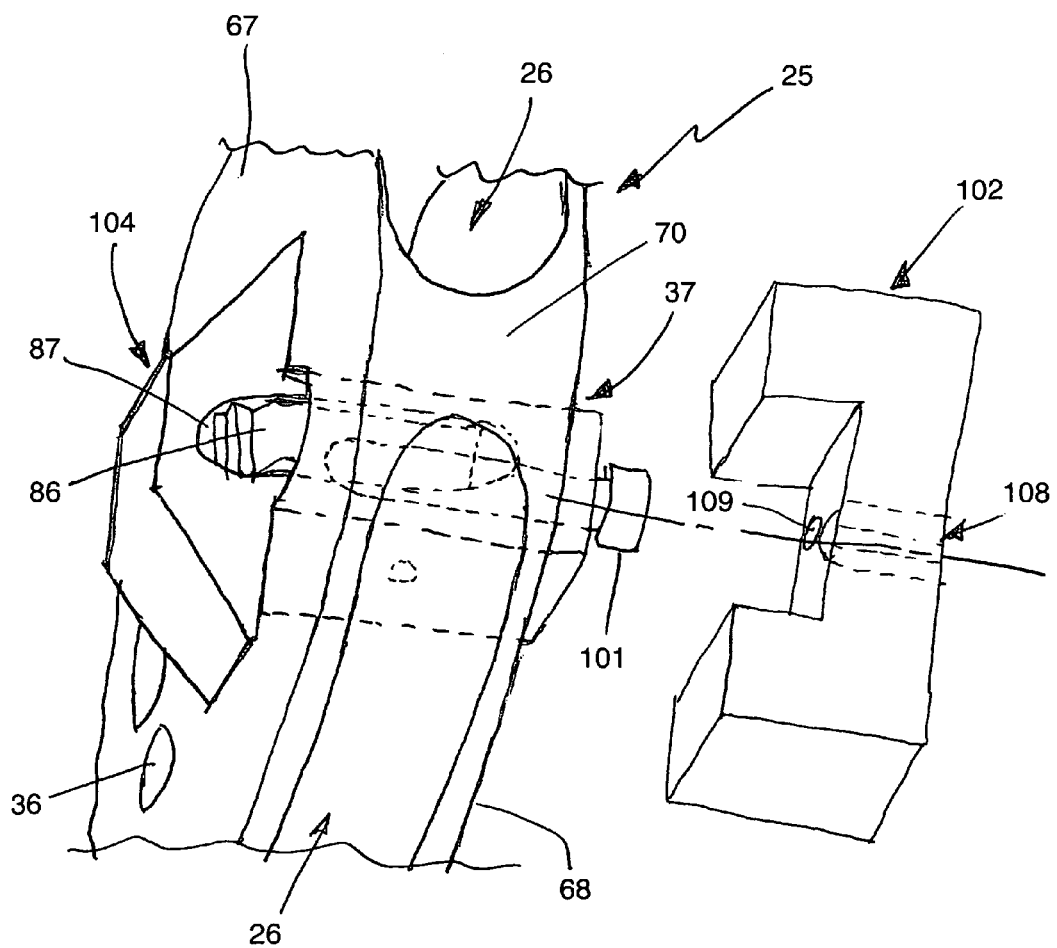
FIG. 31 shows a perspective view of one embodiment of a line cam partially assembled to a terminator.

FIG. 31 shows another embodiment of a line cam 100 that can be fit onto a terminator 25 opening 37, see also FIG. 3. This embodiment of the line cam 100 has a T-shaped cam holder 104 which attaches to a C-shaped cam cap 102, FIG. 33. The cam holder 104 houses a cam 86 in a cam slot 87. The cam 86 is retained by a pin 106. The cam holder 104 is inserted into the opening 37 from the first side 67. The distal end of the cam holder 104 extends from the second side 68 of the terminator 25. The cam cap 102 engages the distal end of the cam holder 104 and is secured with fastener 88. Fastener 88 secures the cam holder 104 and cam cap 102 to the terminator 25.

Figure 32:
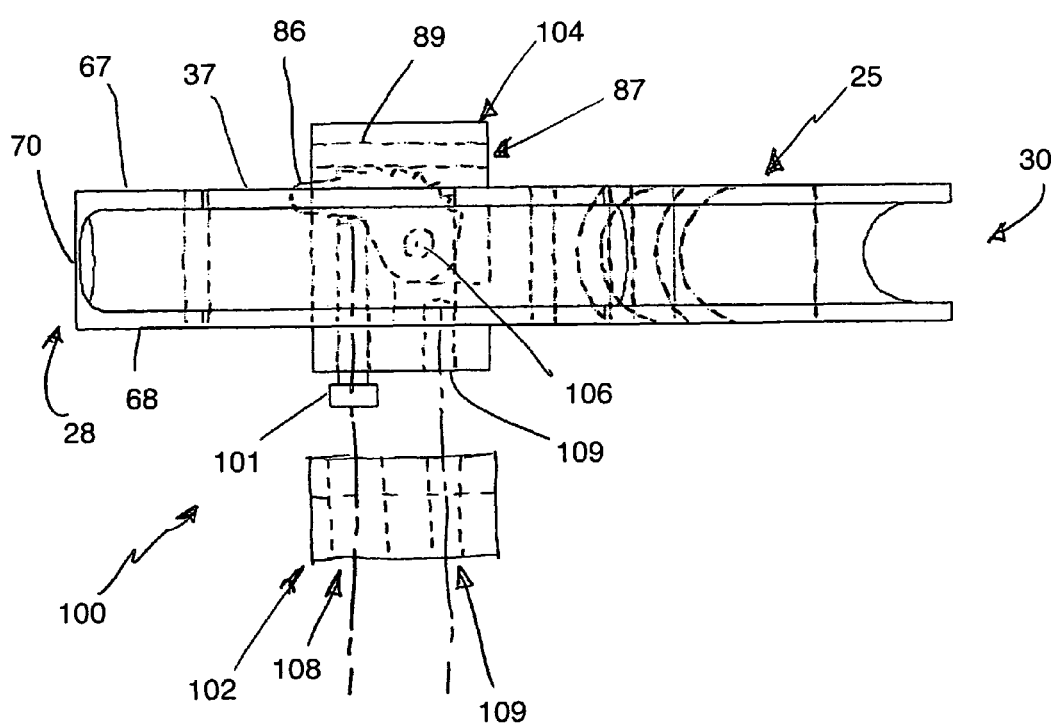
FIG. 32 shows a side view of one embodiment of the line cam partially assembled to the terminator.

There is a retainer hole 108 in the cam cap 102 so that the user can gain access to the retainer 101. The retainer 101 is threaded into the cam holder 104 and engages the cam 86. The retainer 101 can be screwed into the cam holder 104 biasing the cam 86 against a lashing 27 (not shown) inserted into cam slot 87. This allows the user to adjust the lashing 27 and secure the lashing 27 at a fixed length. As noted prior, the lashing 27 is used to adjust the line 29 (not shown) to which the terminator 25 is attached. Obviously the retainer 101 can be loosened such that the lashing 27 is loose for adjustment or replacement. FIG. 32 shows a side view of a partially assembled line cam 100 in the terminator 25.

Figure 33:
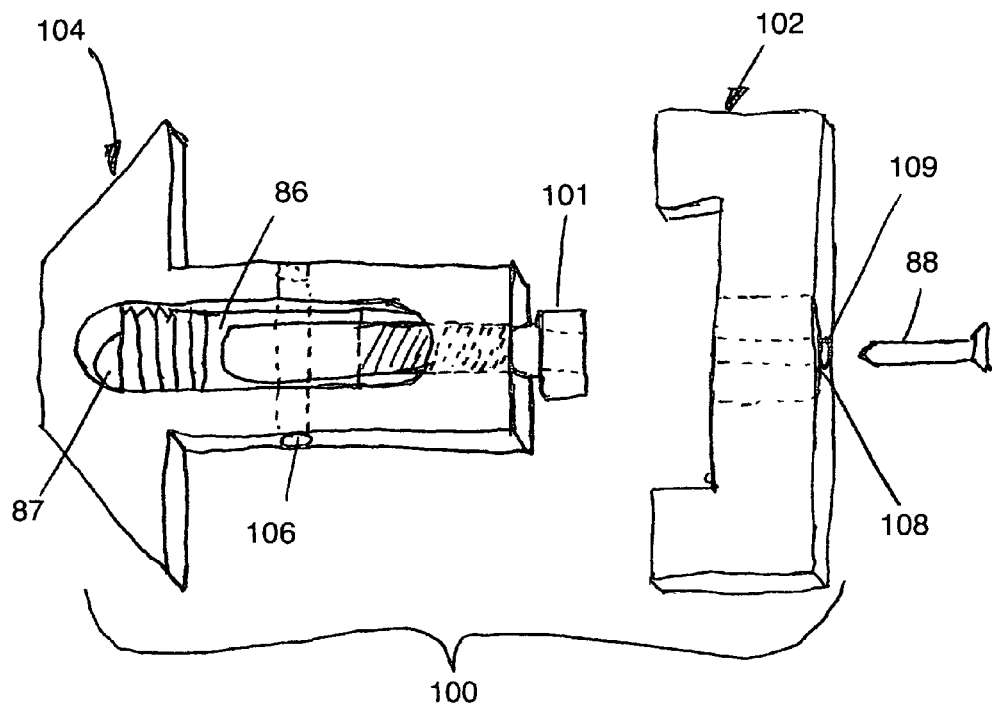
FIG. 33 shows a perspective view of one embodiment of the line cam.
Figure 34:
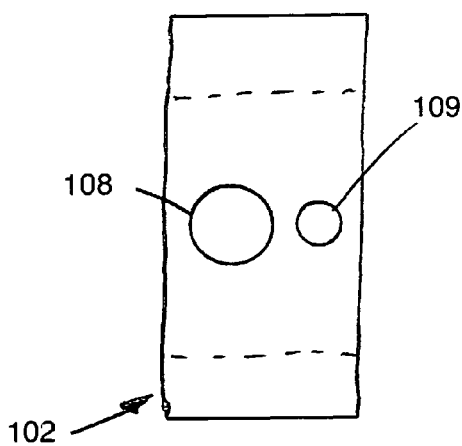
FIG. 34 shows a side view of one embodiment of the cam cap.

FIG. 33 shows an exploded view of the line cam 100 and the interconnection of these elements. FIG. 34 shows an end view of the cam cap 102 showing the relationship of the retainer hole 108 and the fastener hole 109.

It will now be apparent to those skilled in the art that other embodiments, improvements, details and uses can be made consistent with the letter and spirit of the foregoing disclosure and within the scope of this application, which is limited only by any claims, construed in accordance with patent law, including the doctrine of equivalents.

What is claimed is:

1. A device spliced to one end of a line for securing the line to a fixed point with a lashing, the device comprising:
    a tear drop shaped terminator having a top with an apex and a bottom, a first side and a second side;
    the apex is truncated;
    a curved slot along the perimeter of the terminator extending from near a first side of the apex to near the opposite side of the apex, a line, the line spliced to the terminator such that the line is secured in the slot;
    an attachment hole located near the bottom;
    an opening near the apex;
    a plurality of slots located between the attachment hole and the opening, the slots located on a circumference around the attachment hole;
    a lashing; and
    the slots having an inner surface with a radius opening towards the bottom, the lashing threaded through the slots such that the lashing contacts the radial inner surface.

2. The curved slot of claim 1, further comprising:
the radius of the curved slot is approximately five times as large as the diameter of the line.

3. The slots of claim 1, further comprising:
the radius of the inner surface is approximately five times as large as the diameter of the lashing.

* * * * *